(12) United States Patent
Farrokhi

(10) Patent No.: US 10,948,565 B2
(45) Date of Patent: Mar. 16, 2021

(54) SYSTEM FRAMEWORK FOR MOBILE DEVICE LOCATION

(71) Applicant: ETHERWHERE CORPORATION, Sunnyvale, CA (US)

(72) Inventor: Farrokh Farrokhi, San Ramon, CA (US)

(73) Assignee: ETHERWHERE CORPORATION, Sunnyvale, CA (US)

( * ) Notice: Subject to any disclaimer, the term of this patent is extended or adjusted under 35 U.S.C. 154(b) by 228 days.

(21) Appl. No.: 15/933,262

(22) Filed: Mar. 22, 2018

(65) Prior Publication Data

US 2018/0210063 A1   Jul. 26, 2018

Related U.S. Application Data

(63) Continuation of application No. 12/924,618, filed on Oct. 1, 2010, which is a continuation of application
(Continued)

(51) Int. Cl.
*G01S 5/02* (2010.01)
*G01S 19/05* (2010.01)
*G01S 19/42* (2010.01)

(52) U.S. Cl.
CPC .......... *G01S 5/0252* (2013.01); *G01S 19/05* (2013.01); *G01S 19/42* (2013.01)

(58) Field of Classification Search
CPC combination set(s) only.
See application file for complete search history.

(56) References Cited

U.S. PATENT DOCUMENTS

| 5,008,679 A | 4/1991 | Effland et al. |
| 5,615,175 A | 3/1997 | Carter et al. |

(Continued)

OTHER PUBLICATIONS https://digital.library.adelaide.edu.au/dspace/bitstream/2440/49670/8/02whole.pdf , ( Jul. 2008) (Year: 2008).*
(Continued)

*Primary Examiner* — Mamadou L Diallo
(74) *Attorney, Agent, or Firm* — Haynes and Boone, LLP

(57) ABSTRACT

A system for measuring the pseudo range from a target GPS sensor to a designated navigational satellite, for use in a satellite positioning system (SPS) is comprised of multiple GPS sensors for receiving and recording portions of the signals transmitted by designated navigational satellites, the recordings referred to as datagrams; and means for transmitting the datagrams to a datagram processing facility wherein the pseudo range from the target GPS sensor to the designated navigational satellite is derived. The datagram processing facility for deriving the pseudo range is further comprised of a pseudo range engine for deriving a pseudo range from a datagram originating with said target GPS sensor, the location of which is to be determined, the derivation accomplished with the aid of a perfect reference; a perfect reference engine for generating a perfect reference from one or more satellite-specific datagrams: and a strong signal suppression engine for synthesizing satellite-specific datagrams from I/F signals recorded by reference GPS sensors designated for the express purpose of perfect reference generation. The perfect reference reduces the minimum signal strength required to acquire and accurately track GPS satellites at or near the horizon.

8 Claims, 18 Drawing Sheets

Related U.S. Application Data

No. 12/587,096, filed on Oct. 2, 2009, now abandoned, which is a continuation-in-part of application No. 12/387,888, filed on May 9, 2009, now Pat. No. 8,378,886, which is a continuation-in-part of application No. 12/387,885, filed on May 9, 2009, now abandoned.

(56) References Cited

U.S. PATENT DOCUMENTS

| | | | |
|---|---|---|---|
| 5,943,013 A * | 8/1999 | Ohashi | G01S 3/14 |
| | | | 342/417 |
| 7,952,518 B2 | 5/2011 | Whelan et al. | |
| 2001/0034223 A1 | 10/2001 | Rieser et al. | |
| 2002/0122470 A1 * | 9/2002 | Heikkila | H04B 1/71052 |
| | | | 375/147 |
| 2002/0175853 A1 | 11/2002 | Peeters et al. | |
| 2004/0072579 A1 * | 4/2004 | Hottinen | G01S 3/40 |
| | | | 455/456.1 |
| 2006/0106850 A1 | 5/2006 | Morgan et al. | |
| 2007/0194985 A1 | 8/2007 | Monnerat | |
| 2008/0062940 A1 | 3/2008 | Othmer et al. | |
| 2008/0122690 A1 | 5/2008 | Wan et al. | |
| 2008/0248808 A1 | 10/2008 | Alizadeh-Shabdiz | |
| 2008/0252518 A1 | 10/2008 | Yeshayahu | |
| 2010/0309051 A1 | 12/2010 | Moshfeghi | |
| 2012/0165012 A1 | 6/2012 | Fischer et al. | |

OTHER PUBLICATIONS

Wikipedia Article, "Global Positioning System," Sep. 28, 2009 version.

* cited by examiner

SYSTEM FRAMEWORK FOR MOBILE DEVICE LOCATION

CROSS-REFERENCE TO RELATED APPLICATIONS

This application is a continuation of U.S. application Ser. No. 12/924,618, filed Oct. 10, 2010, which in turn claims priority to U.S. application Ser. No. 12/587,096, filed Oct. 2, 2009, which in turn is a continuation-in-part of U.S. application Ser. No. 12/387,888 filed May 9, 2009 and also in a continuation-in-part of U.S. application Ser. No. 12/387,885, filed May 9, 2009.

TECHNICAL FIELD

This matter relates to a multiple-in-multiple-out (MIMO) enhancement for satellite based positioning signal processing.

BACKGROUND

The NAVSTAR Global Positioning System (GPS) developed by the United States Department of Defense uses a constellation of between 24 and 32 Medium Earth Orbit satellites that transmit precise microwave signals, which allows devices embodying GPS sensors to determine their current location. Initial applications were predominantly military; the first widespread consumer application was navigational assistance.

With the explosive growth in mobile communications devices, a new wave of location-based applications is emerging. These applications are characterized by a requirement for device-centered maps. One example is a form of "Yellow Pages" in which a map centered at the location of the mobile device presents user-selected establishments (e.g., barber shops) in situ. Another example would be an application enabling one to locate, on a device-centered map, members of his or her social network. In these applications, location involves but two dimensions (North/South and East/West). The ability of GPS to provide three dimensional locations (or "fixes") is, for the most part, irrelevant. Accordingly, the narrative which follows ignores the three dimensional possibilities. Outdoors, GPS (using four or more satellites) is a reliable and accurate source of the location information essential to enable a device-centered map to be served across a network to a mobile device. However, today's GPS receivers operating in 3D mode (using four satellites) do not have the receive sensitivity required to generate fixes indoors. In 2D mode (using just three satellites and, most commonly, a pseudo satellite located at the center of the earth), the sensitivity improves slightly, but not enough. As a result, location-based applications utilize GPS outdoors, and any of several proprietary location service providers indoors.

Location services are built around proprietary databases, compiled by location service providers. These databases are essentially compilations of the locations of terrestrial transmitting towers (beacons), or compilations of the signal-strength contours surrounding these beacons, or compilations of the locations together with the associated signal-strength contours. A subscriber (to the location service) provides the ID's and (optionally) the associated signal strengths of any beacons detectable by his or her mobile device, and the location service provider responds with its best estimate of the location of the device.

FIG. 1 describes a typical Mobile Device Location System (MDLS) employed by a location service provider to compile its Beacon Location/Signal-Strength Contour Database (BLDB)—the database of beacon locations and associated signal-strength contours utilized in the servicing of subscriber requests. Key elements of this system (in addition to the aforementioned BLDB) are the Beacon Survey Database (BSDB), the Beacon Location/Signal-Strength Contour Engine (BLEN) and the Mobile Device Location Engine (MLEN). The Beacon Survey Database is comprised of measurements taken at various times and places for use by the BLEN in the compilation of the BLDB which, in turn, is used by MLEN to estimate the location of a subscriber's mobile device. As survey measurements are often taken within range of multiple beacons, it is necessary to demultiplex the measurement data for storage in BSDB, which is structured around beacons.

Whether the beacons are cellular towers or Wi-Fi access points—the measurement processes are largely identical. Measurements are taken using instruments similar to (and in some cases, identical to) the mobile communications devices the MDLS has been designed to locate. The standard mode of operation is to traverse the geography of interest with a measuring instrument, pausing periodically to record its location (using GPS) together with the ID's and signal-strengths of any beacons detectable by the device. As these measurements accumulate, beacon locations and associated signal-strength contours are generated and thereafter continually updated by the BLEN, to enable the generation of accurate and reliable estimates of location in response to subscriber requests. On the receipt of a request from a subscriber, the MLEN applies the information provided (by the subscriber) to generate its estimate of the subscriber's location. Methods for generating such estimates are well known in the art. One very simple approach would be to match the beacon presenting the strongest signal (as reported by the subscriber) with a beacon in the BLDB. Absent any signal-strength input, an approach might be to select from the beacons reported by the subscriber, the most frequently sensed, using a "sense count", maintained by the MLEN and stored with each beacon in the BLDB.

The franchise of a location service provider may be valued in terms of its ability to reliably and accurately locate mobile devices. Because the techniques for estimating location and developing contours are understood and commonly practiced, the ability to reliably locate mobile devices hinges on the accuracy and comprehensiveness of the Beacon Survey Database. If the BSDB contains inaccurate measurements, those inaccuracies will result in inaccurate beacon locations or signal-strength contours in the BLDB, which will contribute to inaccuracy in the estimated location of a subscriber's mobile device. Moreover, if the BSDB is sparse, gaps in beacon and contour coverage are possible, rendering the service unreliable to its subscribers. To deliver reliable service thus requires complete and comprehensive coverage of the service domain.

The most common types of beacons in use today are cellular towers and Wi-Fi access points. While the former provide broader coverage in the aggregate, locating them with sufficient precision to enable accurate triangulation to a subscriber location requires a large number of measurements. Resigned to the requirement for a massive Beacon Survey Database, cell-tower-based service providers have, in some cases, opted to construct signal-strength contours as well, to mitigate the estimation error. Given the limited range of a Wi-Fi access point, access-point-based service providers take a different approach. With the acquisition of a handful of measurements for a given beacon, they may be able to estimate its location with sufficient accuracy to begin service immediately to subscribers within range of that beacon. However, there are many more Wi-Fi access points than cellular towers—and, to make matters worse, most are indoors, where the likelihood of three acquirable GPS satellites (required for a 2D GPS fix) is low.

While on the surface it might appear that cell-tower-based systems have the edge over access-point-based systems, some would argue that cell-tower-based systems are out of step with the growth in applications built on the assumption of broadband access, which in turn is fueling the rapid growth in Wi-Fi-only as well as dual-mode (cellular plus Wi-Fi) communications devices. As mobile broadband traffic searches for relief from the cost and congestion of the cellular networks, location-based applications will increasingly favor access-point-based location services. That is not to suggest that access point services will make cell tower services irrelevant; both will be needed.

Considering the limitations of current techniques for compiling large Beacon Survey Databases—there is clearly a need in the art for an MDLS framework to enable rapid, inexpensive compilation of comprehensive Beacon Survey Databases, with the accuracy required by current and contemplated location-based applications.

BRIEF DESCRIPTION OF THE DRAWINGS

FIG. 10(*b*) describes a robust GPS assistance system.

DETAILED DESCRIPTION

Figure 1:
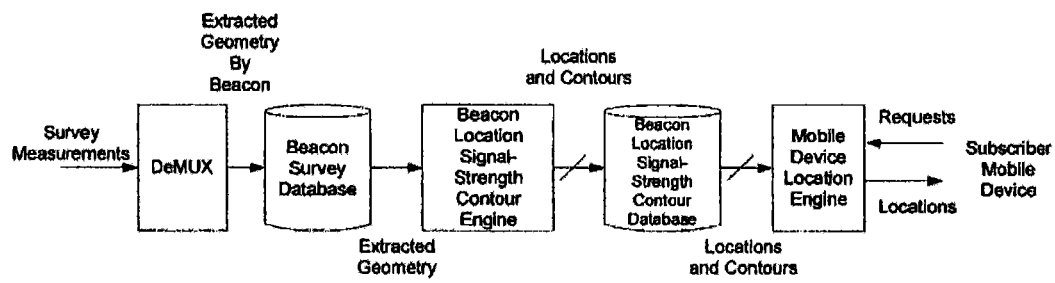
FIG. 1 shows a system diagram of a prior art mobile device location system (MDLS)

In general, the object of the present invention is to provide an MDLS framework to enable the rapid and inexpensive compilation and maintenance of a comprehensive Beacon Location Database, with the accuracy required by current and contemplated location-based applications. As the repository for field measurements; applied ultimately to estimate the locations of subscribers' mobile devices, the Beacon Location Database influences virtually every metric of importance to the operators as well as the subscribers of location services. Measurements must be easily and efficiently obtained, using accurate but inexpensive instruments.

The framework of today's mobile device location systems, which exist to address the occasional failure of on-board GPS, is based on GPS, the implicit premise being that when on-board GPS fails, the network will be able to provide a GPS-based estimate of the location using cues (beacon ID's, signal strengths) supplied by the mobile device. This premise is valid if and only if the occasional failure of GPS (to provide a 2D fix) does not preclude a practically viable MDLS. While cell-tower-based systems have proven their viability in the marketplace, access-point-based systems have yet to demonstrate their viability.

To address the challenges facing today's access-point-based systems, and improve the performance of cell-tower-based systems, a new MDLS framework is disclosed. While the proposed framework is similar in many ways to the framework of today's MDLS, the differences flow from the underlying thesis that some GPS data from a point selected for measurement are better than none—that the fastest, cheapest market-ready estimate of a beacon's location may be an estimate built upon snippets of GPS data (the bulk of which yield insufficient information to generate a 2D GPS fix), measured at different times, in different places, using different instruments. This thesis, underlying the proposed framework, affects the measurement process as follows: Instead of recording a 2D GPS fix together with the ID's and signal-strengths of beacons detectable by the measuring instrument, GPS data are recorded at each point of measurement, without regard for the ability of the data to yield a 2D GPS fix. The piecemeal gathering and assembly of the snippets of GPS data to estimate location are summarized in the description of an MDLS implementation of this thesis (see below).

A convenient corollary of this thesis is that it enables the enlistment of subscribers in the measurement process. Under the current framework, subscribers do not participate in the measurement process, requesting location services when GPS has failed to yield a 2D fix. Under the proposed framework, a request for location service could include GPS data, even though GPS has failed to produce a 2D fix, along with the ID's and signal strengths of any beacons detectable by the subscriber's mobile device. (To the extent a subscriber supplies any information for the purpose of obtaining his or her location, he or she has voluntarily disclosed his or her location; hence the proposed enlistment introduces no issues of privacy.)

Figure 2:
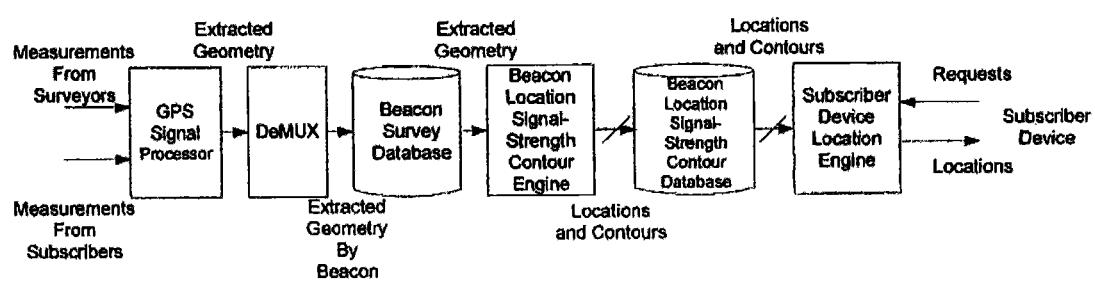
FIG. 2 shows a system diagram of a MDLS employing the present invention

A not-inconvenient corollary of this thesis is that while it facilitates the location of beacons; it does not directly address the challenge of generating signal-strength contours. Nevertheless, given the fact that the utility of signal-strength contours diminishes with the range of the beacon, the potential of the proposed framework to tip the scales toward access-point-based systems and services is undiminished. Last but not least, this thesis, and the resulting framework, favor a thin-client implementation, which, in turn, enables the application of sophisticated signal processing techniques to reduce significantly the minimum signal strength required to acquire GPS satellites FIG. 2 describes an MDLS embodying the proposed framework. In this embodiment, the measurements are presumed to include time-stamped GPS data (also referred to as a datagram) together with the ID's and received signal strength indicators (RSSI's) of any beacons detectable by the measuring instrument, which may be a subscriber's mobile device. In the MDLS of FIG. 2, the time-stamp is included as a cue to assist in the processing of GPS signals, and need not be precise. These measurements are processed by GPS Signal Processor (GPSP) to extract three or more hyperplanes of location if four or more satellite signals of sufficient strength are present, and if not, to extract one or two hyperplanes of location if two or three satellite signals of sufficient strength are present. If, from a single measurement, three or more hyperplanes of location are generated, the GPSP constructs a 2D fix (from the three or more hyperplanes) for use in the generation or update of a signal-strength contour, and then deconstructs the 2D fix into exactly three hyperplanes for use in the generation or update of the estimate of the beacon's location. The processed measurements are then catalogued, by beacon, in the Beacon Survey Database. When sufficient surfaces of location or 2D fixes have been catalogued for a specific beacon, which event could be triggered by a subscriber's request, the Beacon Location/Signal-Strength Contour Engine computes a an estimate of the beacon location or signal-strength contour and adds it to the BLDB, where it immediately becomes available for use in servicing subscriber requests. When a surface of location or a 2D fix is catalogued for a beacon whose location or signal—strength contour has already been estimated, the BLEN updates its earlier estimate and posts it to the BLDB. The MLEN is identical to that of FIG. 1.

The MDLS of FIG. 2 illustrates the thin-client approach to the extraction of GPS satellite signals from the composite GPS signal. First, instead of compiling a database of beacon locations from three-satellite fixes, the proposed framework envisions a database of beacon locations compiled incrementally from "spheres and hyperplanes". To the extent that "spheres and hyperplanes" (requiring one and two satellites, respectively) are more readily acquired than 2D fixes (requiring three satellites) when indoors, where GPS signals are generally scarce, this framework enables the faster, cheaper compilation of market-ready beacon location databases. Furthermore, the enlistment of subscribers in the compilation of the database ensures that once up and running, the database will be maintainable at modest cost.

Second, instead of performing the compute-intensive (and therefore battery depleting) signal processing task at the point of measurement, it is performed offline, where powerful servers are available to implement sophisticated (and generally more compute-intensive) signal processing techniques to maximize the processing gain, reducing the minimum signal strength required to acquire a GPS satellite.

One such technique looks to large datagrams (recordings of the composite GPS signal) as the means to improve signal processing gain. This technique has recently become practical (cf. pending U.S. patent application Ser. No. 12/587,096 and Ser. No. 12/587,099) with the application of a perfect reference. In accordance with the present invention, a method for estimating the location of a beacon from an ensemble of measurements associated with said beacon, where, contained in each measurement, are GPS data from which surfaces of location may be extracted, together with the ID's of beacons detectable at the point of measurement, is disclosed; said method comprising: extracting the canonical set of surfaces of location implicit in each of the associated measurements, and determining the estimate of the location of the beacon as the point for which a weighted sum of the squares of the distances to each of the set of surfaces of location so extracted is minimized.

Also disclosed is a system for the estimation of beacon locations from measurements containing a time-stamped recording of the composite GPS signal (which recording is referred to as a datagram), together with the ID's and associated signal strengths of beacons detectable at the point of measurement; said system comprising:

GPS signal processing means for extracting, from each time-stamped datagram, the canonic set of surfaces of location, and beacon location estimation means for estimating the location of a beacon from an ensemble of surfaces of location associated with said beacon.

In one embodiment of the foregoing system, the GPS signal processing means extracts the canonic set of surfaces of location from datagrams spanning multiple cycles of GPS' 50 Hz data overlay, extending processing gain to its practical limit. In another embodiment, the GPS signal processing means uses a perfect reference, to enable efficient processing of large datagrams. Those skilled in the art will understand that the methods and apparatus of the present invention may be applied to satellite positioning systems evolved from the GPS satellite positioning system, including but not limited to the Galileo and Glasnost systems.

In general, the object of the present invention is to provide an MDLS framework to enable the rapid and inexpensive compilation and maintenance of a comprehensive Beacon Location Database, with the accuracy required by current and contemplated location-based applications. As the repository for field measurements, applied ultimately to estimate the locations of subscribers' mobile devices, the Beacon Location Database influences virtually every metric of importance to the operators as well as the subscribers of location services. Measurements must be easily and efficiently obtained, using accurate but inexpensive instruments.

The framework of today's mobile device location systems, which exist to address the occasional failure of on-board GPS, is based on GPS, the implicit premise being that when on-board GPS fails, the network will be able to provide a GPS-based estimate of the location using cues (beacon ID's, signal strengths) supplied by the mobile device. This premise is valid if and only if the occasional failure of GPS (to provide a 2D fix) does not preclude a practically viable MDLS. While cell-tower-based systems have proven their viability in the marketplace, access-point-based systems have yet to demonstrate their viability.

To address the challenges facing today's access-point-based systems, and improve the performance of cell-tower-based systems, a new MDLS framework is disclosed. While the proposed framework is similar in many ways to the framework of today's MDLS, the differences flow from the underlying thesis that some GPS data from a point selected for measurement are better than none—that the fastest, cheapest market-ready estimate of a beacon's location may be an estimate built upon snippets of GPS data (the bulk of which yield insufficient information to generate a 2D GPS fix), measured at different times, in different places, using different instruments. This thesis, underlying the proposed framework, affects the measurement process as follows: Instead of recording a 2D GPS fix together with the ID's and signal-strengths of beacons detectable by the measuring instrument, GPS data are recorded at each point of measurement, without regard for the ability of the data to yield a 2D GPS fix. The piecemeal gathering and assembly of the snippets of GPS data to estimate beacon location is detailed in the description of an MDLS implementation of this thesis (see below).

In the estimation of signal-strength contours, single-measurement 2D fixes (rather than multi-measurement 2D fixes) are necessary. These may be generated from three satellites and a pseudo satellite (2D mode), from four satellites (3D mode), or from more than four satellites, as described below. A convenient corollary of this thesis is that it enables the enlistment of subscribers in the measurement process. Under the current framework, subscribers do not participate in the measurement process, requesting location services when GPS has failed to yield a 2D fix. Under the proposed framework, a request for location service could include GPS data, even though GPS has failed to produce a 2D fix, along with the ID's and signal strengths of any beacons detectable by the subscriber's mobile device. (To the extent a subscriber supplies any information for the purpose of obtaining his or her location, he or she has volunteered his or her location; hence the proposed enlistment introduces no issues of privacy.)

A not-inconvenient corollary of this thesis is that while it facilitates the location of beacons; it does not directly address the challenge of generating signal-strength contours. Nevertheless, given the fact that the utility of signal-strength contours diminishes with the range of the beacon, the potential of the proposed framework to tip the scales toward access-point-based systems and services is undiminished.

Last but not least, this thesis, and the resulting framework, favor a thin-client implementation, which, in turn, enables the application of sophisticated signal processing techniques to reduce significantly the minimum signal strength required to acquire GPS satellites. As indicated above, GPS data can be recorded in a variety of formats, varying from perhaps the most compact format, a 2D GPS fix, to perhaps the least compact format, a digitized recording of the composite GPS signal. In between are numerous possibilities, from the start-of-transmission and the time of arrival (TOA) of a transmission from an identified GPS satellite, to the start-of-transmission for each of two identified GPS satellites, together with the difference in their times of arrival (TDOA).

Adopting a geometric perspective on the estimation of the location of a beacon, consider the simplest case: namely, estimation based on 2D fixes. Without weighting the fixes for signal strength or geographic distribution or whatever, the location of a beacon may be estimated by simply averaging the associated 2D fixes. If, instead of 2D fixes, measurements for a particular beacon were taken at different times and in different places, and with each measurement, the recorded GPS data included the start-of-transmission and the TOA (measured from the start-of-transmission) from identified GPS satellites, the effect would be to generate spheres of location, centered on the identified satellites, each with radius equivalent to the (computed) distance to said satellite. While the actual 2D locations of these measurements would forever be unknown, the general locations of these measurements would be known by the spheres on whose surfaces they lie. Without weighting the spheres for signal strength or geographic distribution or whatever, the location of the beacon may be estimated by determining the point for which the sum of the squares of the distances to the surfaces of the associated spheres is minimized. (This approach is equivalent to determining the point for which the sum of the squares of the errors in the associated TOA's is minimized.) In this case, all that is needed is one (not three) acquirable satellites per measurement—and an accurate clock, to measure TOA's. It should be noted that the accuracy required of the clock is severe, and in the general case may make single-satellite measurements impractical. A special case, where four or more satellites are available (and, implicitly, an accurate clock) would enable the recording of one to three TOA's, depending on the extent to which privacy considerations may impose a limit on the amount of third-party location information accessible to a location service provider.

To get around the requirement for an accurate clock, another alternative is available, requiring two acquirable satellites. Consider the case in which measurements for a particular beacon were taken at different times and in different places, and with each measurement, the recorded GPS data included the start-of-transmission for each of two identified satellites, together with the TDOA, the effect would be to generate hyperplanes of location, each with its apex on, and its axis collinear with, the line joining the two identified satellites. If a third satellite were acquirable, and the difference in its time of arrival relative to that of either of the first two satellites were measured, the effect would be to generate two hyperplanes of location for that measurement. While the actual 2D locations of these measurements would forever be unknown, the general locations of these measurements would be known by the hyperplanes on whose surfaces they lie. Without weighting the hyperplanes for signal strength or geographic distribution or whatever, the location of the beacon may be estimated by determining the point for which the sum of the squares of the distances to the surfaces of the hyperplanes is minimized. Alternatively, the location of the beacon may be estimated by determining the point for which the sum of the squares of the errors in the associated TDOA's is minimized. However the estimate is derived, the measurements employed require a minimum of two acquirable satellites—and an ordinary clock.

As an aside, it is important to note that the minimization of the sum of the squares of the errors in TOA's and/or TDOA's or of the sum of the squares of the distances to spheres and/or hyperplanes, for example, is but one of many objective functions, contemplated in the present invention, for minimizing beacon location estimation error. Another well-known objective function is min/max, wherein the maximum distance from the estimated location to the surfaces of spheres and/or hyperplanes is minimized. Simple modifications to the foregoing would be to weight the measurements (specifically the associated spheres and/or hyperplanes) within the minimization. Numerous weightings are available to enable high quality estimates. Measurements might be weighted by received signal strength, by time (age), or by a weighting designed to discriminate against "outliers"—measurements that are suspect by virtue of their deviation from the established norm, or by any combination of the foregoing.

We return to enumerating the possible ways GPS data might be recorded. The simplest way is to record the composite GPS signal, together with the ID's and signal strengths of any beacons detectable by the instrument/device, and extract the satellite signals offline. The disadvantage of this approach (occurring when a subscriber device operates as a measurement device) is the bandwidth utilized to transmit the GPS data (also called the datagram); the advantage is the potential to apply sophisticated signal processing techniques to decode long datagrams (hundreds of milliseconds in length), and enhance further the sensitivity of GPS receivers (see below). Using powerful servers, spheres (times of arrival) and hyperplanes (differences in times of arrival) are extracted from the datagrams, and posted to the Beacon Survey Database. Points (2D fixes) derived from the spheres or hyperplanes extracted from a single measurement are likewise posted to BSD for use in estimating signal-strength contours.

In the generation of spheres, hyperplanes, and points, it is important that the elemental underlying GPS satellite data be used but once in the estimation of beacon location and signal-strength contours. One way to insure against the inadvertent reuse of the underlying satellite data is to use spheres and hyperplanes exclusively in the estimation of beacon location. Furthermore it is important that overdetermined measurements are not inadvertently overweighted, owing to the possibility that more than three spheres or hyperplanes might be generated from a single measurement. Hence, the notion of a canonical set of surfaces of location: For each measurement, for each beacon detectable at the point of measurement, the canonical set is defined to be: [0056] a) Empty, when no satellites are acquirable, [0057] b) A single sphere, when exactly one satellite is acquirable—and an accurate clock is available to measure the time of arrival, [0058] c) One or two hyperplanes, when two or three satellites are acquirable, and [0059] d) Three spheres or three hyperplanes, when four or more satellites are acquirable, as long as limits imposed by privacy considerations are observed.

When, in case (d), more than four satellites are acquirable, single-measurement 2D fixes may be constructed using techniques such as the least-squares minimization described above for estimating the location of beacons, and then deconstructed into three spheres or three hyperplanes for use in estimating beacon locations. As the foregoing illustrations reveal, the proposed framework has much in common with the framework of today's MDLS. Whether the beacons are cellular towers or Wi-Fi access points (or the beacon of the future)—the proposed measurement processes are largely identical. As with the existing framework, the measuring instruments employed are similar, if not identical, to the mobile communications devices for which the MDLS has been designed to locate. The standard mode of operation is modified, but slightly; namely, to traverse the geography of interest with the instrument, pausing periodically to record GPS data together with the ID's and signal-strengths of any beacons detectable by the instrument. As these measurements accumulate, the beacon locations and associated signal-strength contours are generated and thereafter continually updated by the BLEN, to enable the generation of accurate and reliable estimates of location in response to subscriber requests. In a departure from today's MDLS, the subscriber's mobile device (assuming on-board GPS) serves as an instrument in the ongoing measurement process.

FIG. 2 describes an MDLS embodying the proposed framework. In this embodiment, the measurements are presumed to include time-stamped datagrams (digitized GPS signals) together with the ID's and received signal strength indicators (RSSI's) of any beacons detectable by the measuring instrument, which may be a subscriber's mobile device. The time-stamp is included as a cue to assist in the processing of GPS signals, and need not be precise. These measurements are processed by GPS Signal Processor (GPSP) to extract three or more hyperplanes of location if four or more satellite signals of sufficient strength are present, and if not, to extract one or two hyperplanes of location if two or three satellite signals of sufficient strength are present. If, from a single measurement, three or more hyperplanes are generated, the GPSP constructs a 2D fix (from the three or more hyperplanes) for use in the generation or update of a signal-strength contour, and then deconstructs the 2D fix into exactly three hyperplanes for use in the generation or update of the estimate of the beacon's location. The processed measurements are then catalogued, by beacon, in the Beacon Survey Database. When sufficient surfaces of location (for beacon estimation) or 2D fixes (for contour estimation) have been catalogued for a specific beacon, which event could be triggered by a subscriber's request, the Beacon Location/Signal-Strength Contour Engine computes a an estimate of the beacon location or signal-strength contour and adds it to the BLDB, where it immediately becomes available for use in servicing subscriber requests. In the MDLS of FIG. 2, the cataloguing of two surfaces of location is sufficient, as BLEN applies a pseudo satellite at the earth's center to generate an initial estimate of the beacon's location. When a surface of location or a 2D fix is catalogued for a beacon whose location or signal-strength contour has already been estimated, the BLEN updates its earlier estimate and posts it to the BLDB. The MLEN is identical to that of FIG. 1.

The MDLS of FIG. 2 illustrates the thin-client approach to the extraction of GPS satellite signals from the composite GPS signal. First, instead of compiling a database of beacon locations from three-satellite fixes, the proposed framework envisions a database of beacon locations compiled incrementally from "spheres and hyperplanes". To the extent that "spheres and hyperplanes" (requiring one and two satellites, respectively) are more readily acquired where GPS signals are scarce; e.g., indoors, this framework enables the faster, cheaper compilation of market-ready beacon location databases. Furthermore, the enlistment of subscribers in the compilation of the database ensures that once up and running, the database will be maintainable at modest cost.

Second, instead of performing the compute-intensive (and therefore battery depleting) signal processing task at the point of measurement, it is performed offline, where powerful servers are available to implement sophisticated (and generally more compute-intensive) signal processing techniques to maximize the processing gain, reducing the minimum signal strength required to acquire a GPS satellite.

One such technique looks to large datagrams (recordings of the composite GPS signal) as the means to improve signal processing gain. This technique has recently become practical (cf. pending U.S. patent application Ser. No. 12/587, 096 and Ser. No. 12/587,099) with the application of a perfect reference. To appreciate the potential of this technique requires some background in GPS signal processing.

GPS Signals and Signal Processing Technique

The signals from all GPS satellites are broadcast synchronously, using the same carrier frequency, 1.57 GHz in the case of the NAVSTAR system. However, each satellite has a unique identifier, or pseudorandom noise (PRN) code having 1023 chips, thereby enabling a GPS receiver to distinguish the GPS signal from one GPS satellite from the GPS signal from another GPS satellite. In addition, each satellite transmits information allowing the GPS receiver to determine the exact location of the satellite at a given time. The GPS receiver determines the distance (pseudo range) from each GPS satellite by determining the time delay of the received signal. Given the exact locations and the pseudo ranges, the estimation of 2D location coordinates can be accomplished with as few as two satellite pseudo ranges, provided they have been measured using an accurate time reference. Since this is impractical with current GPS navigational platforms, the computation of 2D location coordinates is generally accomplished using three pseudo ranges. Once the pseudo ranges for at least three GPS satellites have been determined, it is a straightforward process to determine the location coordinates of the GPS receiver.

Figure 3:
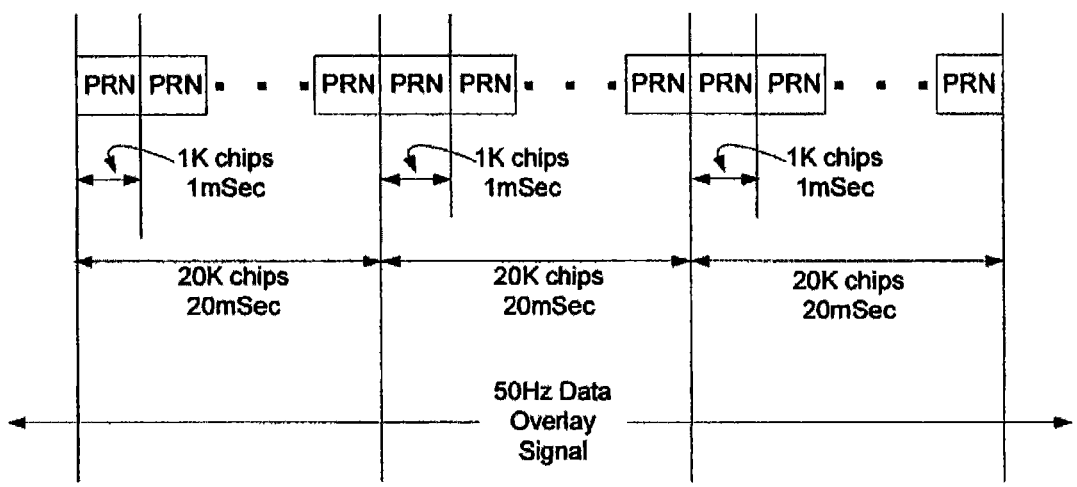
FIG. 3 describes the data structure transmitted by a GPS satellite.

FIG. 3 describes the data structure of the signal that is broadcast by each GPS satellite; as illustrated, the signal consists of a 50 Hz data overlay signal—20 millisecond data bits—modulating a one millisecond PRN code interval of 1023 bits or chips. The PRN code is known as a spreading code because it spreads the frequency spectrum of the GPS signal. This spread spectrum signal is known as a direct sequence spread spectrum (DSSS) signal.

Figure 4:
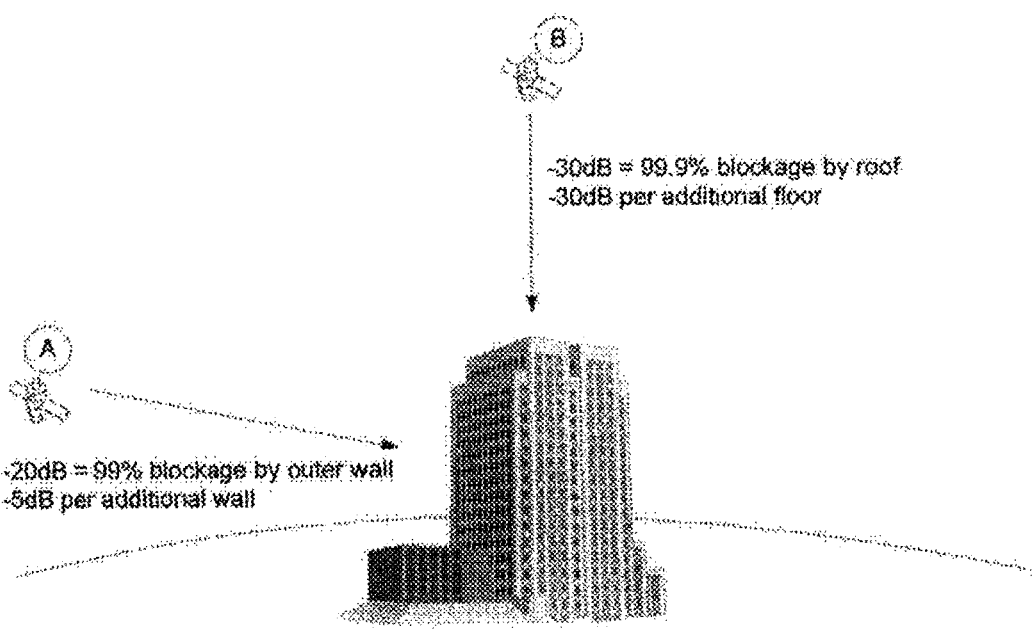
FIG. 4 illustrates the nature of path losses experienced by satellite signals penetrating commercial buildings.

Indoors, satellite signals suffer severe path losses as they are forced to penetrate windows, walls, and ceilings enroute to the receiver. Commercial buildings, in particular, introduce severe path losses (FIG. 4). Along the vertical, the roof and each intermediate floor contribute losses of estimated at 30 db. Exterior walls provide an estimated loss of 20 db, with interior walls adding 5 db each. Clearly, the indoor environment favors satellites near the horizon (over those directly above).

Figure 5:
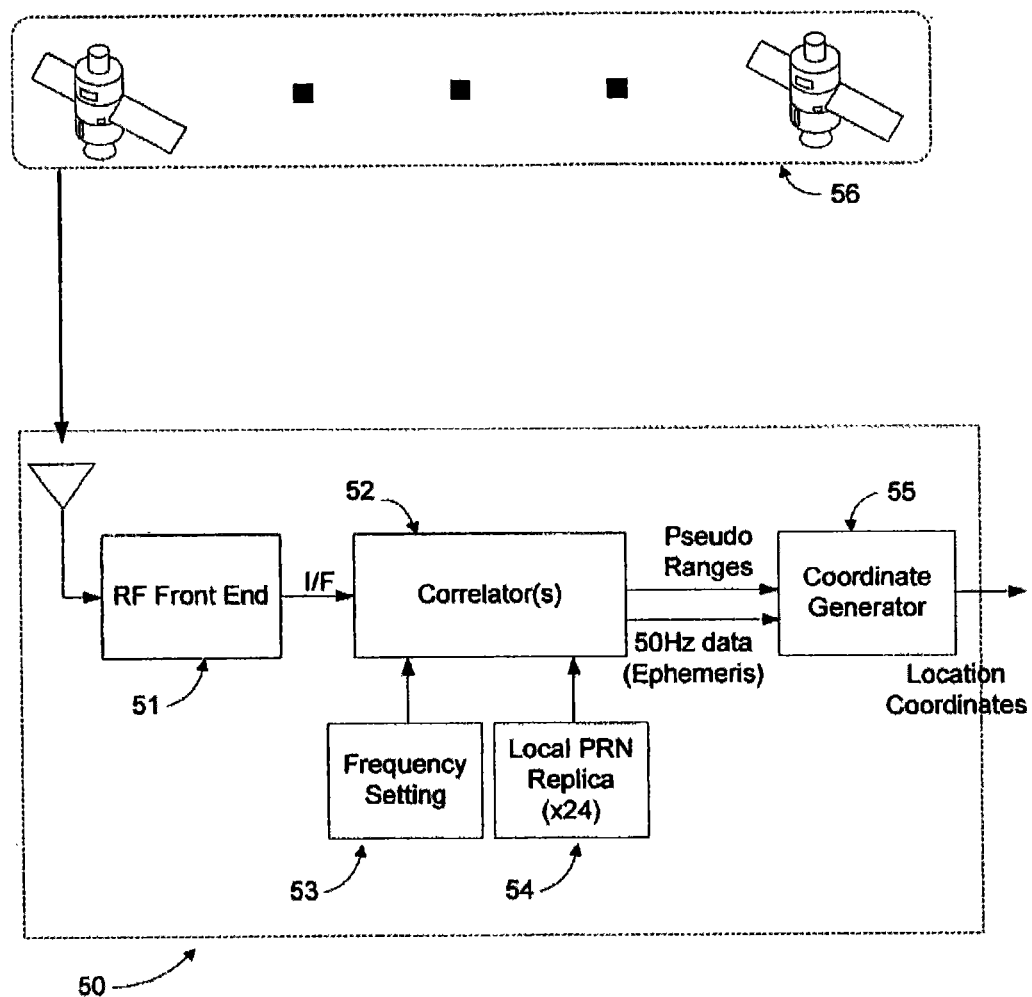
FIG. 5 shows a block diagram of a prior art GPS receiver.

FIG. 5 illustrates a block diagram of a prior art GPS receiver. The GPS signal from GPS satellite constellation 56 is received by the R/F front end 51 of GPS receiver 50. R/F front end 51 down converts the 1.57 GHz R/F signal, resulting in an intermediate frequency (I/F) signal. The streaming I/F signal is examined by a correlator or bank of correlators 52, employing a search algorithm to confirm the presence or absence, within the composite GPS signal, of the uniquely coded signals from the GPS satellites. In a typical search algorithm, the local frequency 53 is scanned across a range of frequencies; for each frequency, a series of correlations involving the incoming GPS signal and all possible code phases of a local replica 54 of the designated satellite's PRN code are used to "acquire" the designated satellite (i.e., establish the presence of the designated satellite signal within the composite GPS signal). In order to ensure that the correct code phase is not missed due to local clock off-set, it is conventional to increment the local replica code phase in one-half chip or even smaller steps. The granularity of these steps is limited by the amount of over sampling that is performed on the incoming I/F signal. A high correlation peak value indicates that the designated satellite is present, and its signal, decodable. If no correlations peaks are high enough, the local frequency 53 is set to a second trial frequency and the correlations are repeated. Once pseudo range information has been obtained for at least three GPS satellites along with the corresponding satellite timing information, the coordinate generator 55 determines the two-dimensional location coordinates of GPS receiver 50.

To obtain a first fix, GPS receiver 50 must (1) acquire a minimum of three GPS satellites by tuning the local frequency 53 and the code phase of the local PRN code replica 54 in the GPS receiver to match the carrier frequency and the PRN code phase of each of the electronically visible (i.e., decodable) satellites. The search for correlation peaks of sufficient strength to enable the extraction of reliable pseudo range information is a time-consuming process, and failure-prone in indoor and urban canyon environments.

Figure 6:
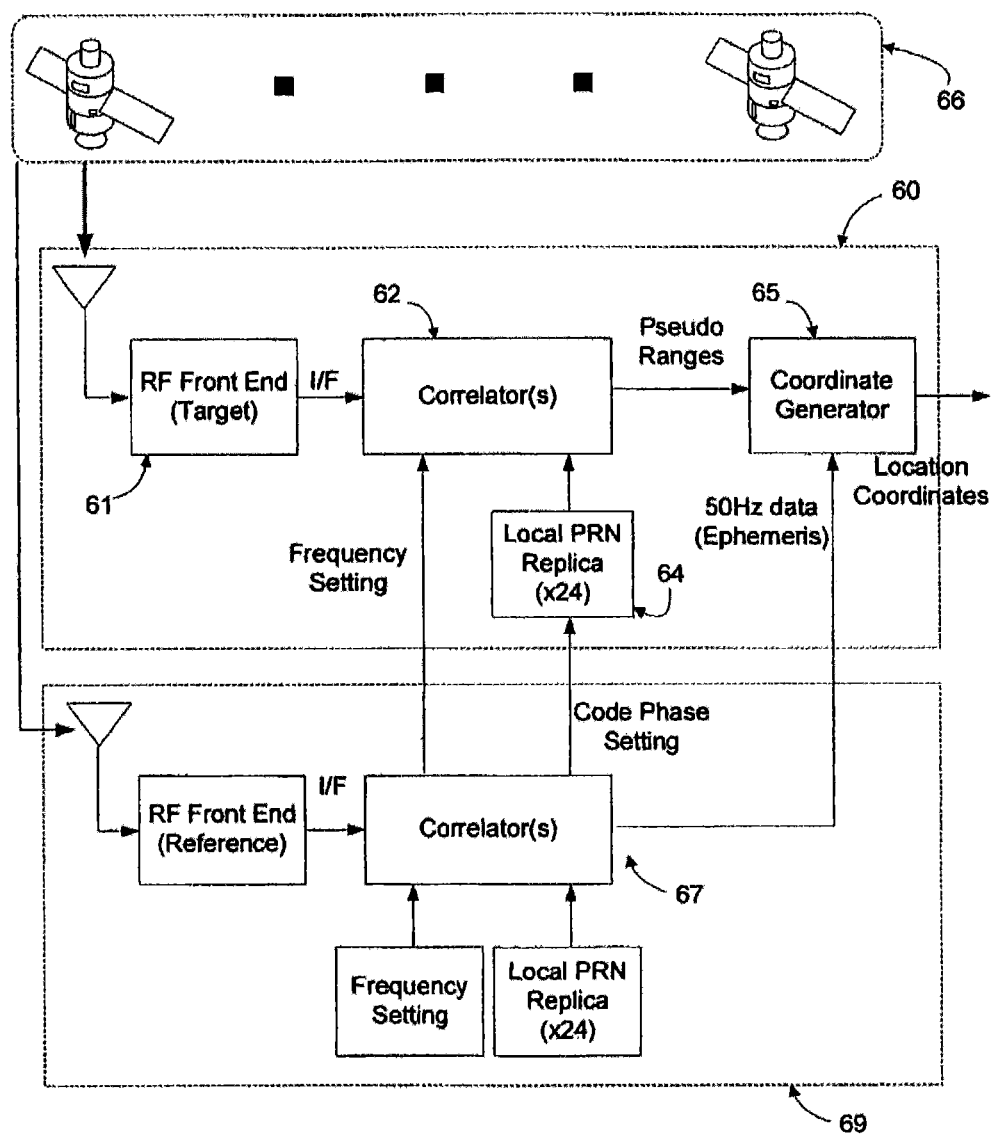
FIG. 6 shows a block diagram of a prior art assisted-GPS receiver.

To minimize the time to first fix (TTFF) of GPS receivers such as GPS receiver 50, the concept of a GPS assistance system has been introduced (see FIG. 6). The role of GPS assistance system 69 is to track the satellites electronically visible at the site of GPS assistance system 69, and provide assistance, in the form of carrier frequency and PRN code phase information to GPS receiver 60 in the vicinity of GPS assistance system 69. As in the case of GPS receiver 50, the GPS signal from GPS satellite constellation 56 is received by the R/F front end 61 of GPS receiver 60. R/F front end 61 down converts the 1.57 GHz R/F signal, resulting in an intermediate frequency (I/F) signal. The streaming I/F signal is examined by a correlator or bank of correlators 62, which is used to acquire satellites. To expedite the acquisition process, carrier frequency and PRN code phase information derived by GPS assistance system 69, in the course of tracking acquirable satellites, is transmitted to GPS receiver 60. This information is used to initialize the search algorithm, enabling the algorithm to operate more efficiently and more effectively. As a result the TTFF is significantly reduced, and receive sensitivity is improved marginally, to the extent that information provided enables the acquisition of satellites otherwise electronically invisible (that is to say, their signals are not decodable) to GPS receiver 60. Once pseudo range information has been determined for three GPS satellites, the location coordinates are determined by coordinate generator 65.

Care must be taken in the generation of GPS assistance data, to insure the integrity of data for satellites at or near the horizon, as these may be the satellites most visible indoors. If GPS assistance data are generated from GPS signals taken in the clear, for example, strong overhead satellite signals could compromise the integrity of GPS assistance data generated for weaker satellites at or near the horizon.

Figure 7:
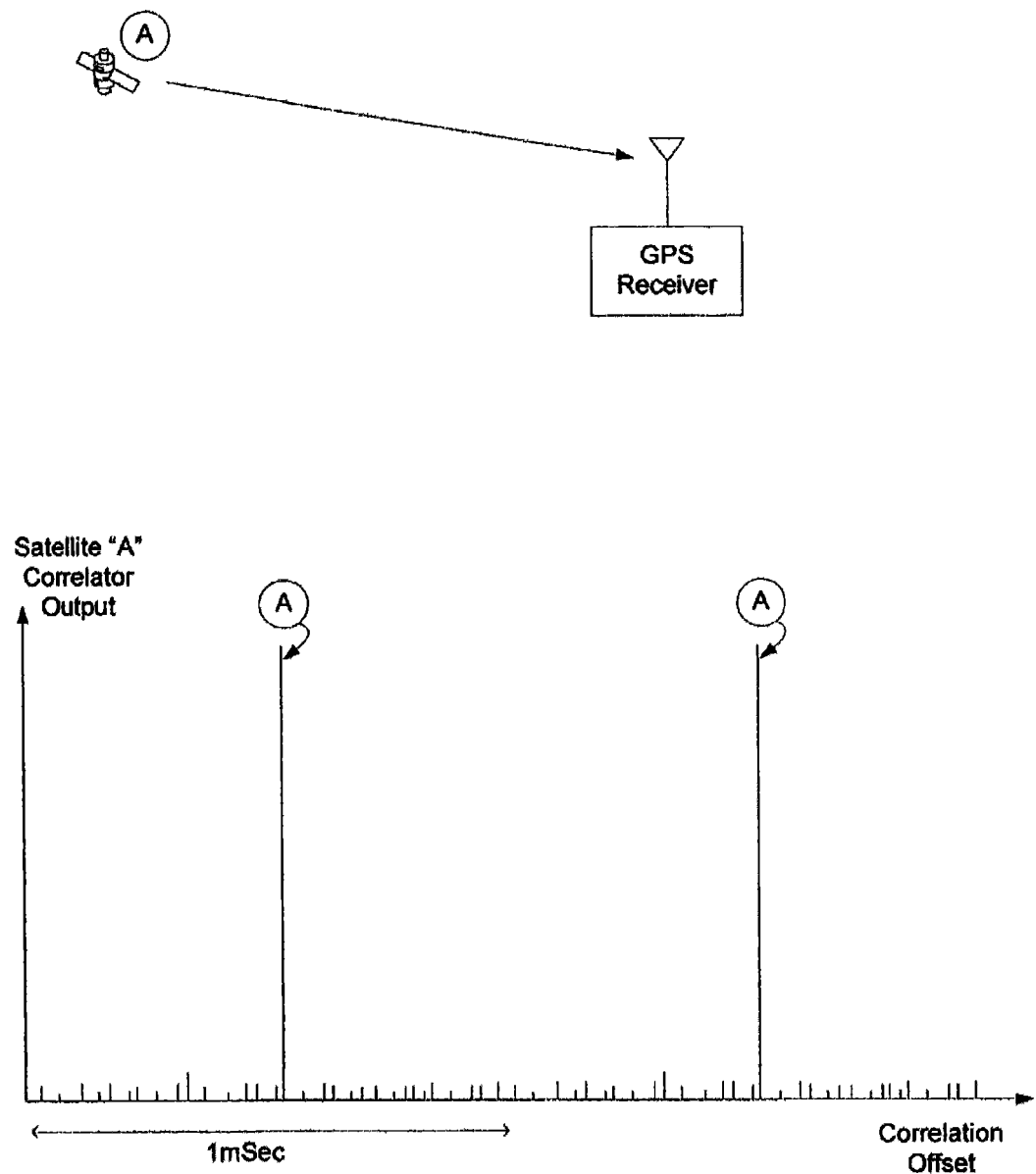
FIG. 7 describes the output of a correlator.
Figure 8:
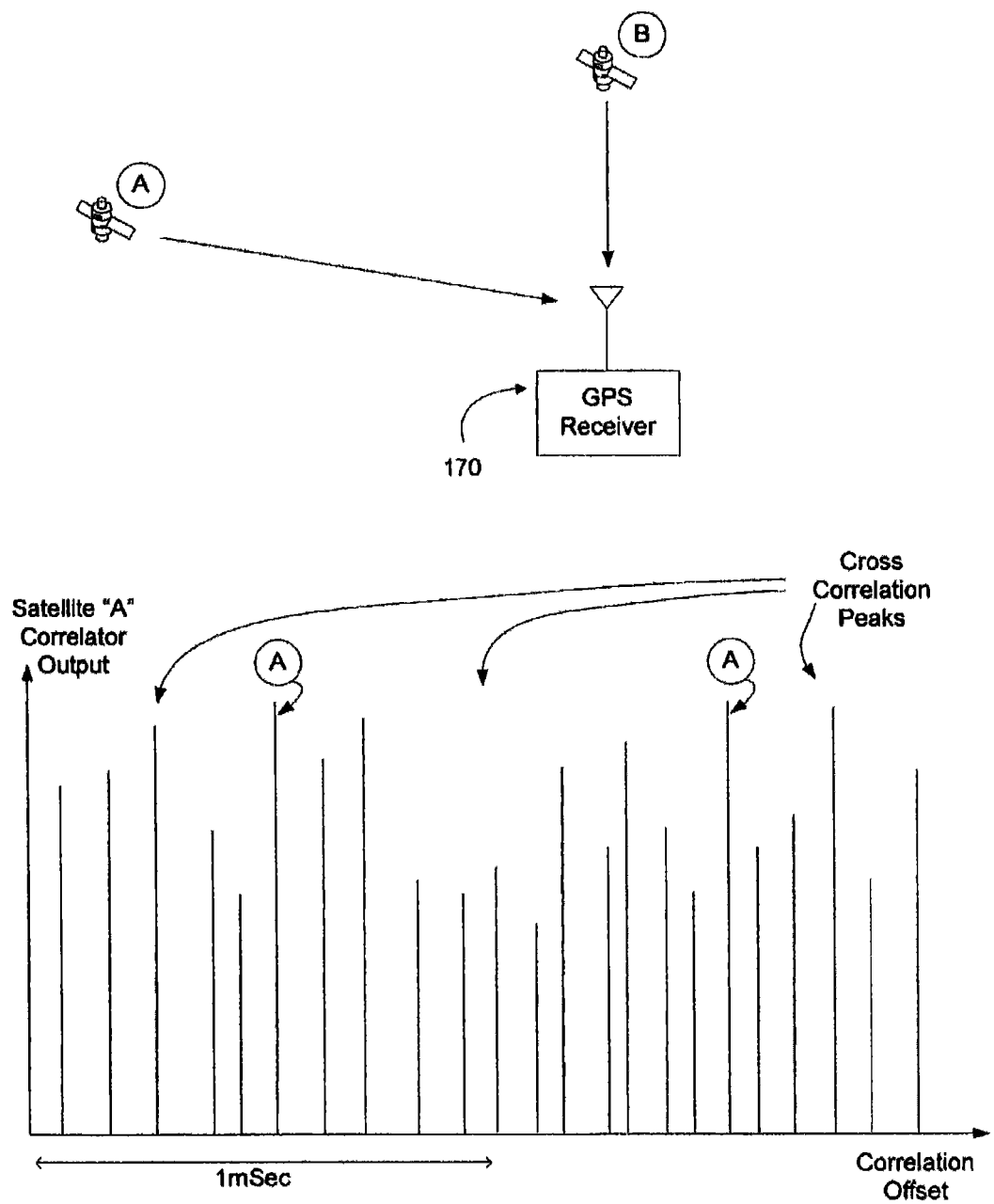
FIG. 8 describes the output of a correlator.
Figure 9:
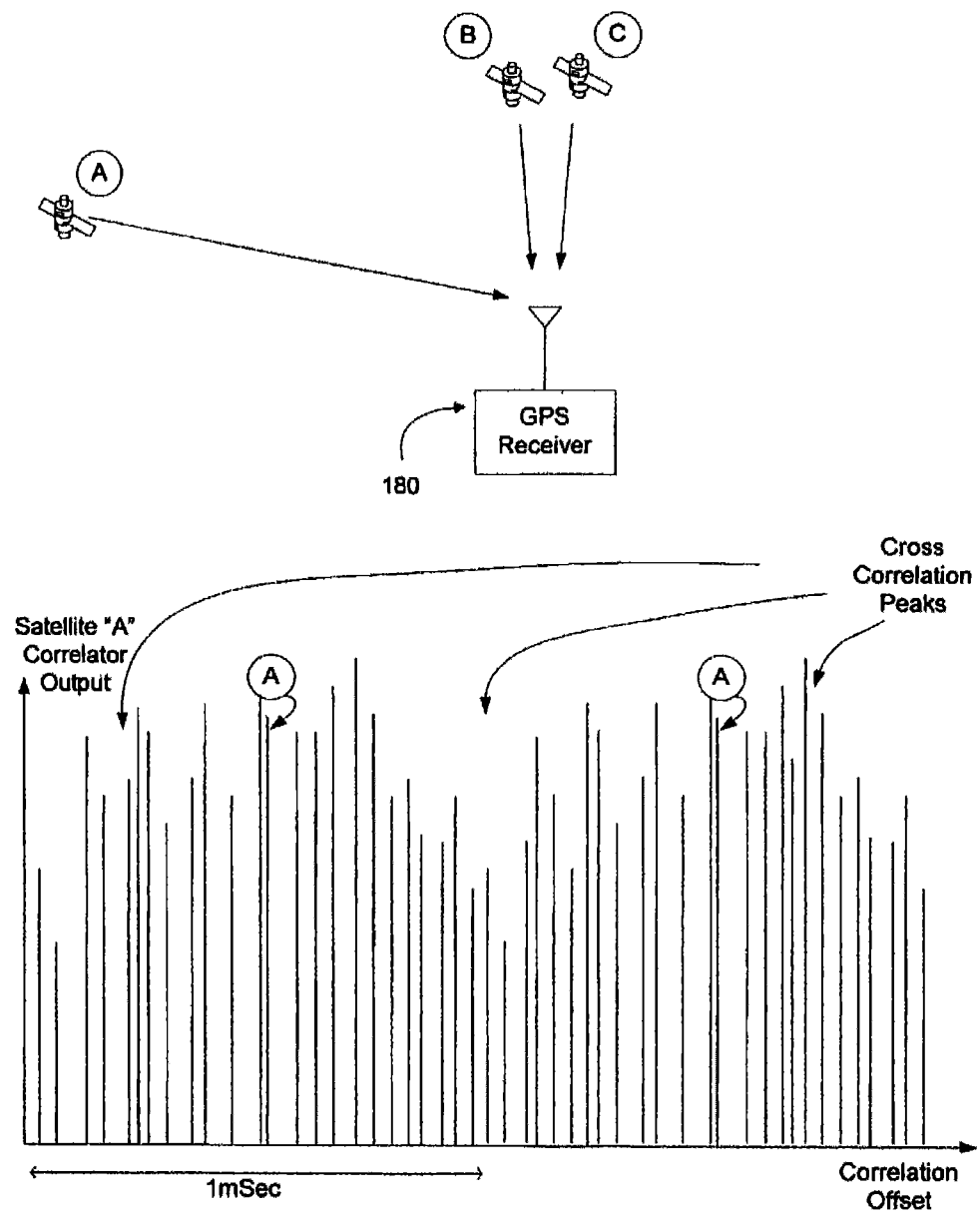
FIG. 9 describes the output of a correlator.

The potential for strong satellite signals to interfere in the tracking of weak satellite signals is an artifact of the correlation process which serves as the foundation for GPS satellite signal acquisition and tracking techniques. This is illustrated in FIGS. 7-9. FIG. 7 describes the output of the correlation of the composite GPS satellite signal with the PRN code for weak satellite A, as it would appear if all other GPS satellites were turned off. A distinct peak in the correlator output marks the presence of (a signal from) satellite A. In FIG. 8, strong satellite B has been turned on, and the output of the correlator has changed, revealing prominent cross correlation peaks owing to the relative strength of (the signal from) satellite B. In FIG. 9, another second strong satellite C has been turned on, adding additional prominent cross correlation peaks to the correlator output. These figures illustrate how the search for the autocorrelation peak corresponding to weak satellite A is complicated, if not completely frustrated, by the prominent cross correlation peaks introduced by the strong satellites B and C.

Figure 10A:
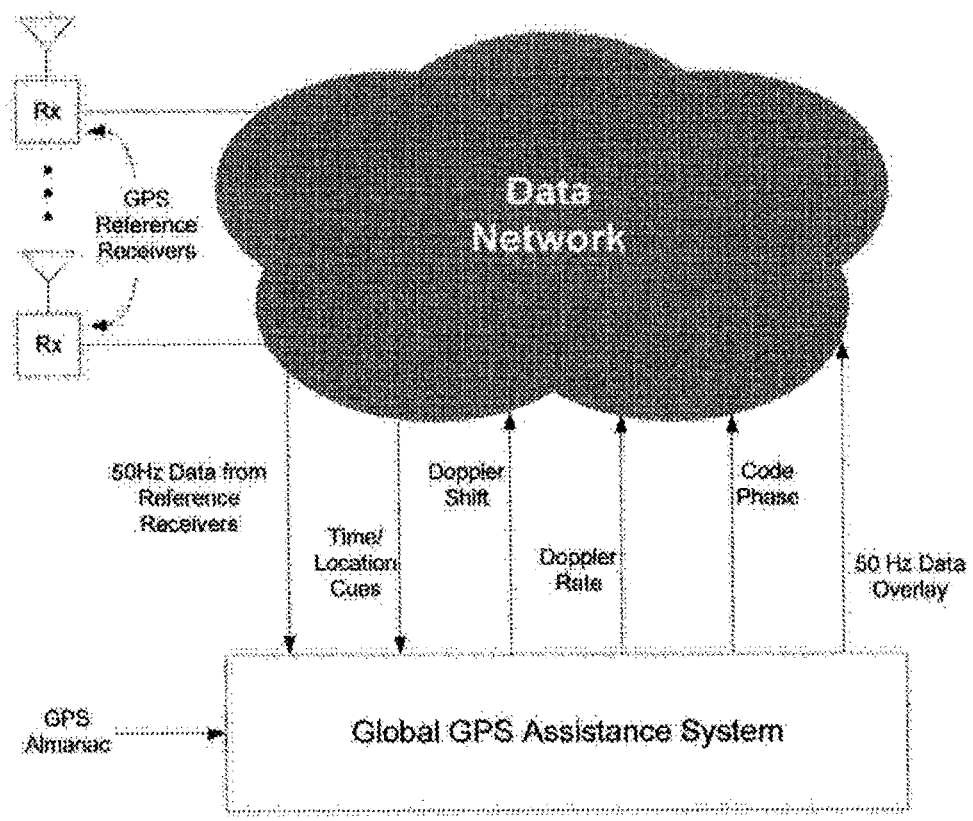
FIG. 10(*a*) describes a robust GPS assistance system.

To insure the integrity of GPS assistance data for satellites at or near the horizon, a global alternative to GPS assistance system 69 is proposed. One embodiment of this Global GPS Assistance System (GGAS) is described in FIG. 10a. GGAS is the hub of a world-wide GPS assistance service in which GPS receivers such as GPS receiver 60 are client-subscribers. By deploying a (small) number of GPS receivers strategically around the globe, each of the 24-32 satellites are tracked without strong-signal interference, contributing to a more robust GPS assistance system. The 50 Hz data overlay from each of the satellites, recorded at the globally deployed GPS receivers, is assembled and forwarded (to client GPS receivers) from GGAS. In addition, GPS almanac information is applied to generate Doppler shift and code phase offset information in response to client-supplied time and location cues. Note that the GPS assistance data provided by the GGAS of FIG. 10a includes the rate of change of the carrier frequency (Doppler rate), as well as the shift in carrier frequency (Doppler shift), code phase offset, and the 50 Hz data steam, for each potentially acquirable satellite.

The utility of GGAS extends beyond conventional thick-client implementations of GPS for sensor location; indeed, GGAS provides an ideal foundation for sophisticated thin-client implementations of GPS for beacon location, such as the MDLS of FIG. 2.

Thin-Client GPS

Figure 11:
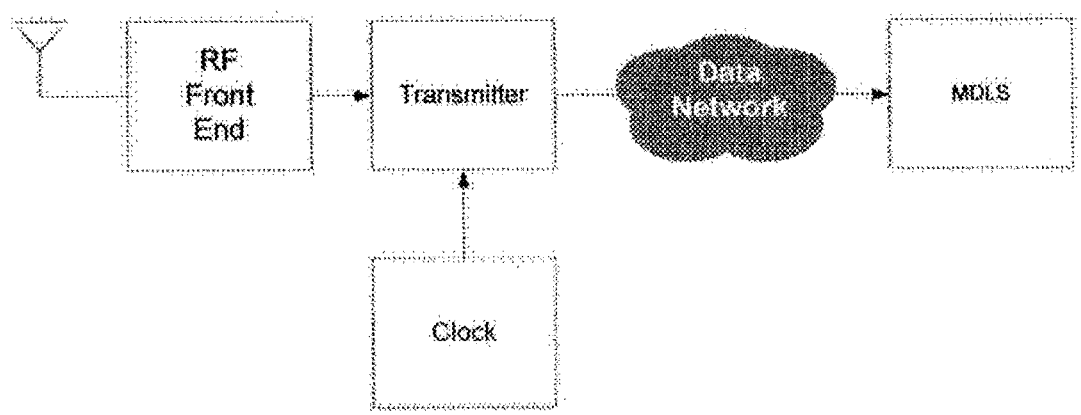
FIG. 11 shows a block diagram of a thin GPS client used in a thin-client implementation of a GPS signal processing system employing the present invention.
Figure 12:
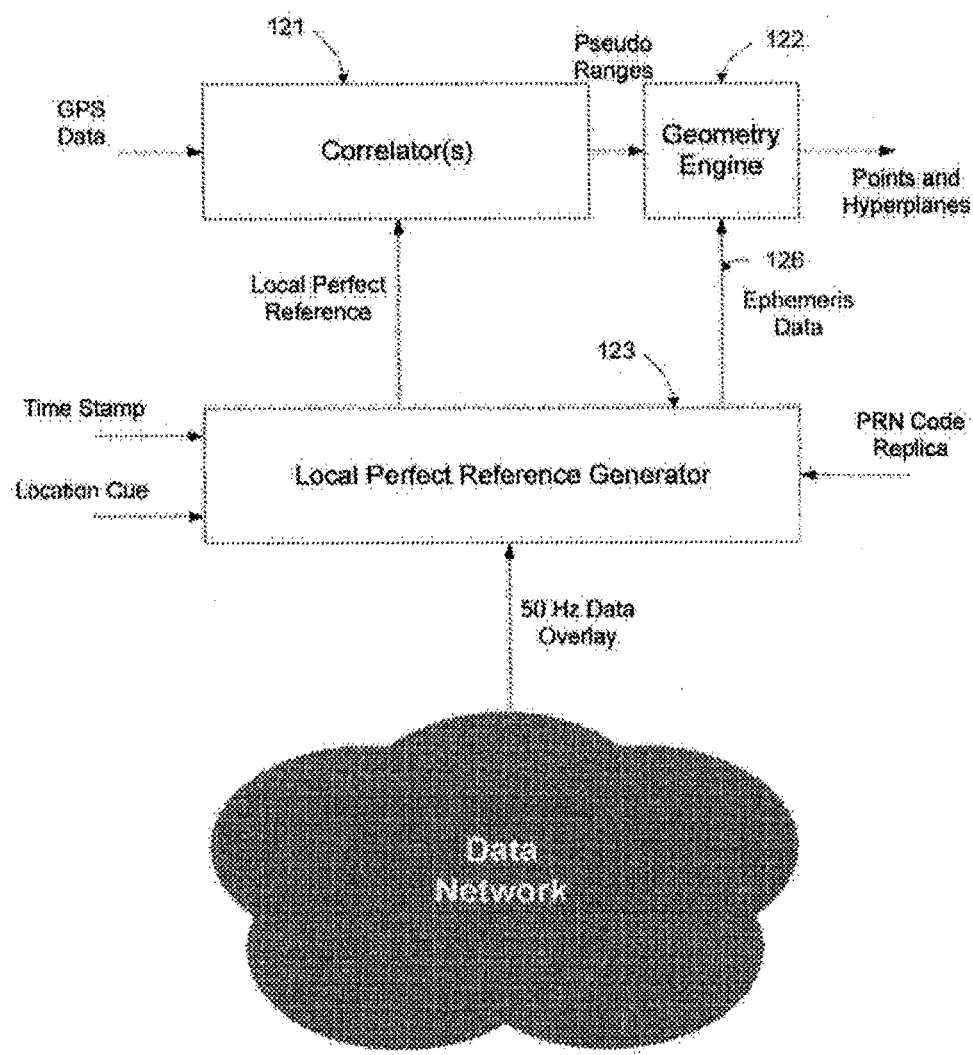
FIG. 12 shows a block diagram of a GPS server used in a thin-client implementation of a GPS signal processing system employing the present invention.

In the compilation of beacon location databases utilizing the MDLS of FIG. 2, the GPS client contained in the measuring instrument/mobile device is a minimal subset of the thick client contained in conventional GPS-equipped mobile devices (FIG. 11). All that is required is an antenna, an RF front end, a clock (which need not be precise) and a transmitter to enable GPS data to make their way to the MDLS server. The server component (GPSP) is more complex. FIG. 12 details one embodiment of the GPSP of FIG. 2.

As described previously, each measurement contains beacon-specific as well as measurement-specific information. In the category of measurement-specific information are the time stamp and the datagram. The GPSP of FIG. 12 requires, in addition, a location cue, which requirement may be satisfied by the location (in BLDB) of any of the detected AP's. Should none of the detected AP's be found in BLDB, an alternative such as the most recently recorded 2D GPS fix would suffice.

As shown in FIG. 12, the GPS data is input to Correlator (or bank of correlators) 121. Correlator 121 correlates the datagram, parsed from the received measurement, with the perfect references for each of the potentially acquirable satellites, to determine pseudo ranges to those satellites. Apart from the fact that the perfect reference substitutes for the carrier frequency setting and PRN code replica, present in prior art, Correlator 121 differs only in its capability to process long datagrams—datagrams spanning one or more cycles of the 50 Hz data overlay. The pseudo ranges are processed by Geometry Engine 122, using ephemeris data 126 extracted by Local Perfect Reference Generator 123, from the localized 50 Hz data overlay provided by a Global GPS Assistance System. The Geometry Engine of FIG. 12 provides hyperplane output for the estimation of beacon locations, and 2D fixes for the estimation of signal-strength contours. This portion of the datapath is not unconventional.

The unconventional element of the GPSP of FIG. 12 revolves around Local Perfect Reference Generator (LPRG) 123. As the figure shows, the outputs of LPRG 123 consist of local perfect references for each potentially acquirable satellite to Correlator (or bank of correlators) 121, and ephemeris data 126 to the Geometry Engine 122. Inputs to LPRG 123 include a time stamp and a location cue, parsed from the received measurement; the streamed 50 Hz data overlay for each of the potentially acquirable satellites, from GGAS; and PRN code replicas, used to generate local perfect references for the potentially acquirable satellites.

The Perfect Reference

To understand the rationale for and operation of LPRG 123, consider the impact of the size of a datagram. Correlator 121, and correlators in general, are better able to detect signals buried in noise when they are able to examine longer (larger) datagrams. Signal processing is compute-intensive, and, as a consequence, the limits on the size of datagrams are generally imposed by limits on available computing resources. Today's thick-client GPS systems are constrained to datagrams of the order of 10 milliseconds. Thin-client implementations, leveraging powerful servers capable of processing datagrams spanning hundreds of milliseconds, open the door to dramatic increases in processing gain, resulting in dramatic reductions in the minimum signal strength required to acquire and track GPS satellites. The goal of the GPSP of FIG. 12 is to realize this potential.

Figure 10B:
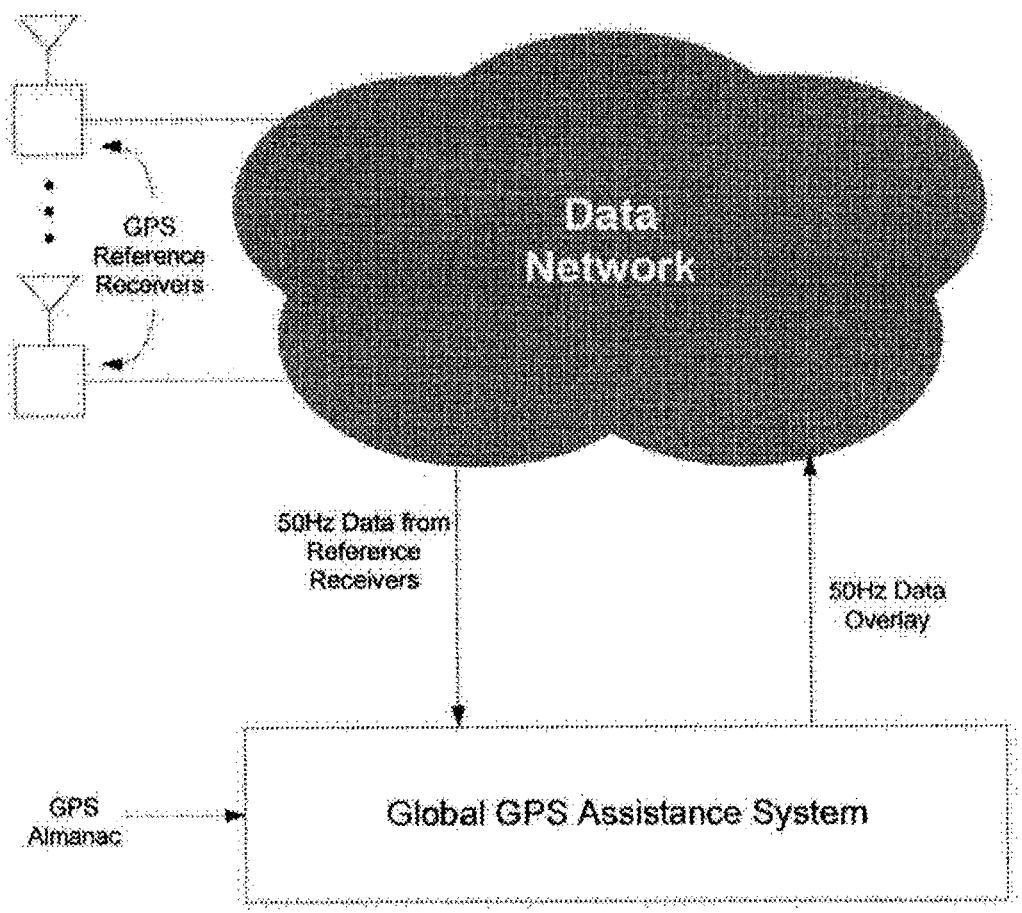

The key to efficient implementation is a perfect reference. In general, a perfect reference is defined as any reconstruction of a transmitted GPS satellite signal, inclusive of the 50 Hz data overlay. In the context of this patent application, the term is used to describe reconstructions which span one or more cycles of the 50 Hz data overlay. The terms "long datagram" or "large datagram" are likewise used to describe datagrams which span one or more cycles of the 50 Hz data overlay. A local perfect reference is a specific reconstruction of the transmitted GPS satellite signal as it would present to an observer at a specific time and place (absent interference of any sort). The construction of a perfect reference for a specific satellite is a straightforward process, given the 50 Hz data stream from the satellite and its PRN code replica. The construction of local perfect references for a set of potentially acquirable satellites is likewise straightforward, using the satellite positions and trajectories embedded in the 50 Hz data overlays to determine the satellite-specific carrier frequencies, and their rates of change, as well as their relative code phase offsets. FIG. 10b describes a minimal implementation of the Global GPS Assistance System of FIG. 10a, wherein GPS assistance is provided in the form of continuous 50 Hz data streams for each of the 24 to 32 GPS satellites. The GGAS of FIG. 10b (or any functional superset) may serve as the source of the 50 Hz data streams presumed in FIG. 12. With a time stamp and a location cue; the streamed 50 Hz data overlay for each of the potentially acquirable satellites (from GGAS); and PRN code replicas for each of the potentially acquirable satellites, LPRG 123 generates the local perfect references critical to the accurate and efficient extraction of surfaces of location from the received GPS data.

Self-Locating Beacons

The methods and systems detailed herein enable (without modification) the introduction of the self-locating beacon. Consider the case in which the beacon and the measuring instrument are collocated (and stationary). In this case, measurements recorded at different times, in the same place, for the same beacon, are used to estimate the location of the beacon. Access points (be they Wi-Fi AP's or Femtocells), outfitted with the thin client of FIG. 11, could locate themselves over a period of hours, and continually refine their self-estimated location in the days following installation.

The Thin-Client Alternative (to Thick-Client GPS)

Figure 13:
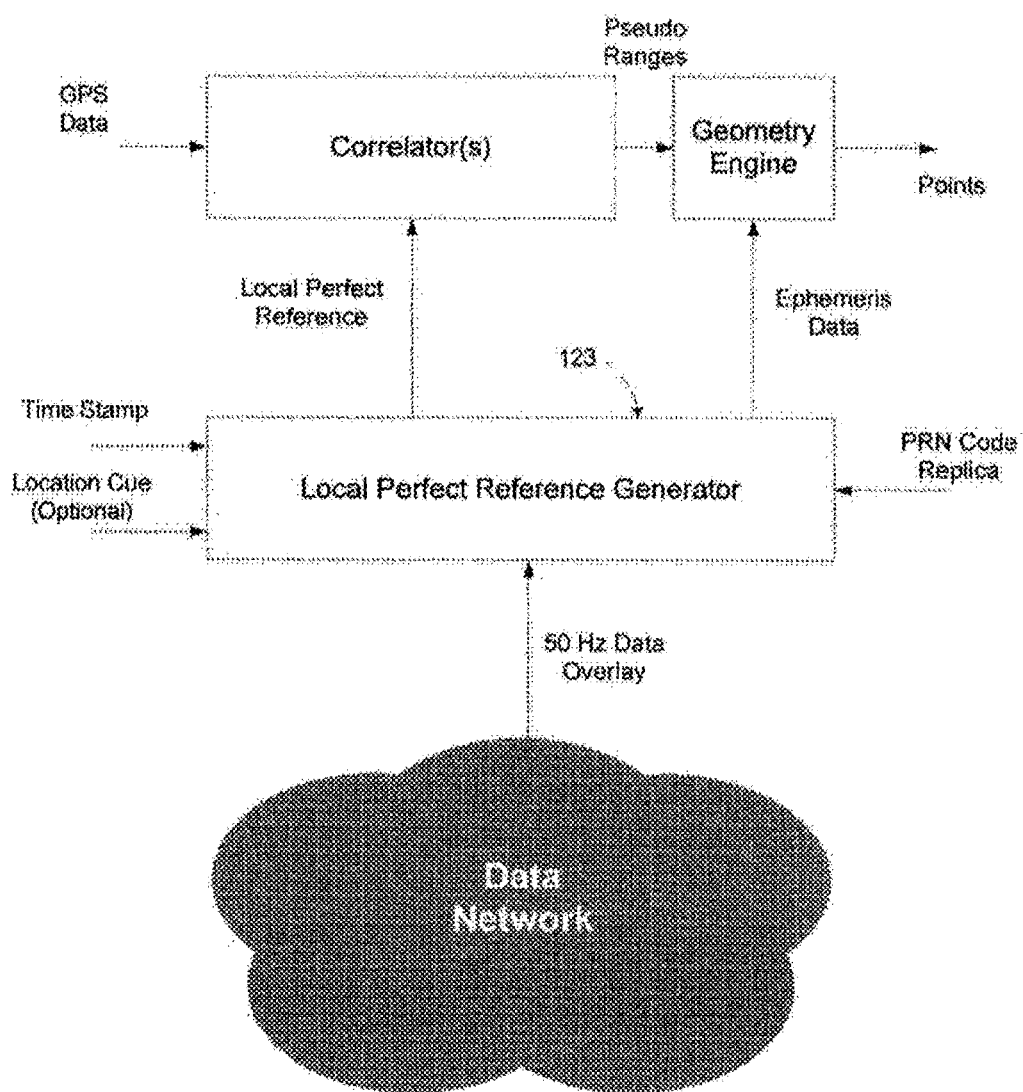
FIG. 13 shows a block diagram of a GPS server used in a thin-client implementation of a GPS signal processing system employing the present invention

While the methods and systems described in the foregoing paragraphs enable the rapid, inexpensive compilation of Beacon Location/Signal-Strength Contour Databases, they equally applicable to the common task of locating a GPS sensor, in a mobile device for example. FIG. 13 describes the server component of a thin-client implementation of a GPS processing system for use in the location of GPS sensors. With the exception that the Geometry Engine of FIG. 13 remains idle until the number of acquirable satellites is sufficient to generate a fix, the GPSP uses a local perfect reference to realize the benefit of large datagrams just as the GPSP described in FIG. 12. To the extent that it presumes a location cue, it presumes, in effect, a cellular network connection. As access-point-based location services assume the burden of locating mobile devices indoors, the impact of this limitation will narrow to Wi-Fi-only mobile devices used outdoors, where short datagrams are sufficient and the lack of a location cue does not present a problem. (Absent a location cue, the GPSP of FIG. 13 would process short datagrams, unassisted, in the manner of tens of millions of GPS-equipped cellphones in use today.)

3D Location-Based Applications

Should the requirements of location-based applications evolve to 3D, the inventions disclosed and taught in this patent application are applicable, with trivial extension, to 3D Mobile Device Location Systems.

Another factor in GPS signal processing is the potential for strong satellite signals to interfere in the tracking of weak satellite signals. This is an artifact of the correlation process which serves as the foundation for GPS satellite signal acquisition and tracking techniques. This is illustrated in FIGS. 7-9. As noted above FIG. 7 describes the output of the correlation of the composite GPS satellite signal with the PRN code for weak satellite A, as it would appear if all other GPS satellites were turned off. A distinct peak in the correlator output marks the presence of (a signal from) satellite A. In FIG. 8, strong satellite B has been turned on, and the output of the correlator has changed, revealing prominent cross correlation peaks owing to the relative strength of (the signal from) satellite B. In FIG. 10, a second strong satellite C has been turned on, adding additional prominent cross correlation peaks to the correlator output. As the figure illustrates, the search for the autocorrelation peak corresponding to weak satellite A is complicated if not completely frustrated by the prominent cross correlation peaks introduced by the strong satellites B and C. Under these circumstances, a GPS assistance system may be unable to provide useful information on weak satellite A to target GPS receivers in its vicinity. On its surface, this does not appear to be a serious limitation: "How important can it be to provide assistance in the acquisition of weak satellites, especially if the strong satellite information is accurate?" The answer to this question depends, of course, on the circumstance of the target GPS receiver. When the target receiver is indoors, especially on the lower floors of a multi-story commercial building, this information is likely to be critical, as the only satellites acquirable may be those near the horizon, the same satellites that are likely to have been compromised by stronger overhead satellites at the site of the GPS assistance system.

Strong Signal Suppression

To the extent that the satellites electronically visible to target GPS sensors inside commercial buildings are likely to be near the horizon, and at the same time these satellites may be electronically invisible to reference GPS sensors, owing to the interference of stronger signals from overhead satellites, techniques for reducing the minimum signal strength required by GPS Satellite Positioning Systems (SPS) to acquire and accurately track satellites near the horizon are critical. The use of multiple reference GPS sensors, each incorporating an antenna and a front end, provides a conceptual framework for such techniques.

The techniques disclosed herein address the strong signal interference problem by selecting/synthesizing satellite-specific signals, each with the strongest potentially-interfering signals suppressed. (By suppressing the strong potentially-interfering signals, the prominent cross correlation peaks are suppressed, as shown in FIG. 9.) The techniques to select/synthesize satellite-specific I/F signals from composite GPS satellite signals recorded at reference GPS sensors vary with the type of antenna deployed with the reference GPS sensors. The antennae may be uni-directional or omni-directional or a mix of the two. For the sake of brevity, this disclosure focuses on homogeneous GPS sensor/antenna deployments; that is, SPS deploying either uni-directional or omni-directional antennae. SPS deploying a mix of uni-directional and omni-directional antennae are rational systems, implemented straightforwardly using the teachings of this disclosure.

In the case that uni-directional antennae are deployed, the invention postulates a hemisphere (with its origin in the neighborhood of the target receiver) partitioned into N+1 elements, corresponding to the directional attributes of N+1 antennae deployed with N+1 reference GPS sensors. Each of the reference GPS sensors down converts the (composite) satellite signal, yielding the I/F signal (bit stream) appropriate to the acquisition of the satellite or satellites within the field of view of its directional antenna. To illustrate one example of hemisphere partitioning, consider 9 GPS sensors/antennae—2 pointed North, 2 pointed East, 2 pointed South, 2 pointed West, and one pointed upward—with each pair able to "see" 45 degrees to either side of its horizontal aiming point. If each pair is further constructed to cover complementary elevations (e.g., 0-30 degrees and 30-60 degrees), the hemisphere is covered completely. This partitioning provides 4 GPS sensors for near-horizon satellites, and 5 for overhead satellites. With its knowledge of the approximate locations of all the hemispherically visible (i.e., likely to be decodable based on time and trajectory) satellites at all times, the SPS system maintains an up-to-date table of available satellites with their corresponding GPS sensors. (Note that this mapping need not be 1 for 1, as the partitioning of the hemisphere may not preclude the presence of multiple satellites within the field of view of a single GPS sensor.)

In the case that omni-directional antennae are deployed, the invention postulates the capability to attenuate at least N strong satellite signals to enable the acquisition of a weak satellite signal. Accordingly, N+1 reference GPS sensors are deployed. Each of the reference GPS sensors down converts the composite satellite signal, yielding an I/F signal (bit stream) which, together with the I/F signals from the remaining N reference GPS sensors, enables the synthesis of I/F signal(s) appropriate to the acquisition of weak satellite signal(s). The synthesis involves the use of novel signal processing techniques to realize the I/F signal(s) corresponding to one or more designated satellites, each with N of the strongest potentially-interfering satellite signals suppressed. These techniques are embodied within a subsystem characterized as a Strong Signal Suppression Engine.

The Datagram Processing Facility

Figure 14:
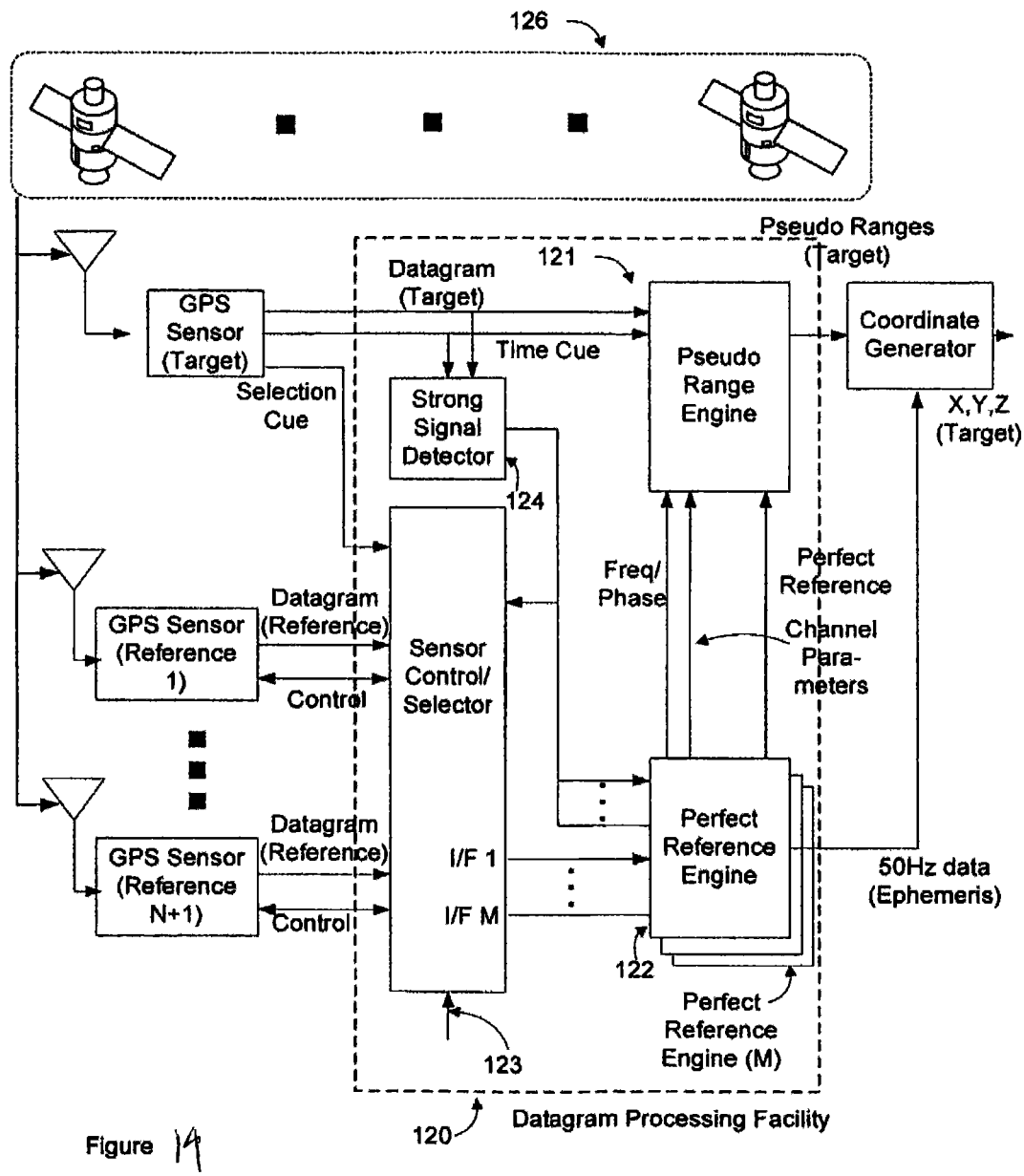
FIG. 14 shows a block diagram of a datagram processing facility employing the present invention.

FIG. 14 describes a Datagram Processing Facility. The principle elements are 1) the Pseudo Range Engine 121, 2) the Perfect Reference Engine 122, 3) the Sensor Controller/Selector 123, and 4) the Strong Signal Detector 124. The Strong Signal Detector 124 has two major functions. The first, strong signal detection function, identifies (on the basis of a minimal datagram) the signals/satellites with the greatest potential for acquisition, based on their signal strength. This information is used by the Sensor Controller/Selector 123 to select the set of reference GPS sensors/datagrams with the greatest potential to optimize the efficiency and efficacy of the perfect reference generation process. The second function of the Strong Signal Detector 124 is to provide additional information characterizing the signals from each of the satellites identified as having the greatest potential for acquisition. This information is used by the Perfect Reference Engine 122 (and by the Strong Signal Suppression Engine, if present) to configure/initialize these engines to optimize the efficiency and efficacy of the perfect reference generation process.

Figure 15:
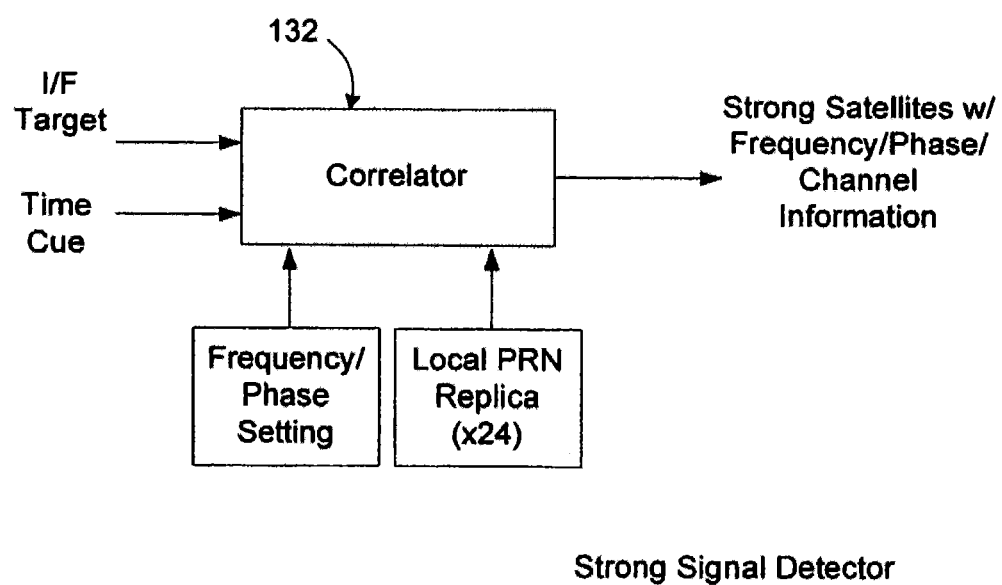
FIG. 15 describes one construction of a strong signal detector
Figure 16:
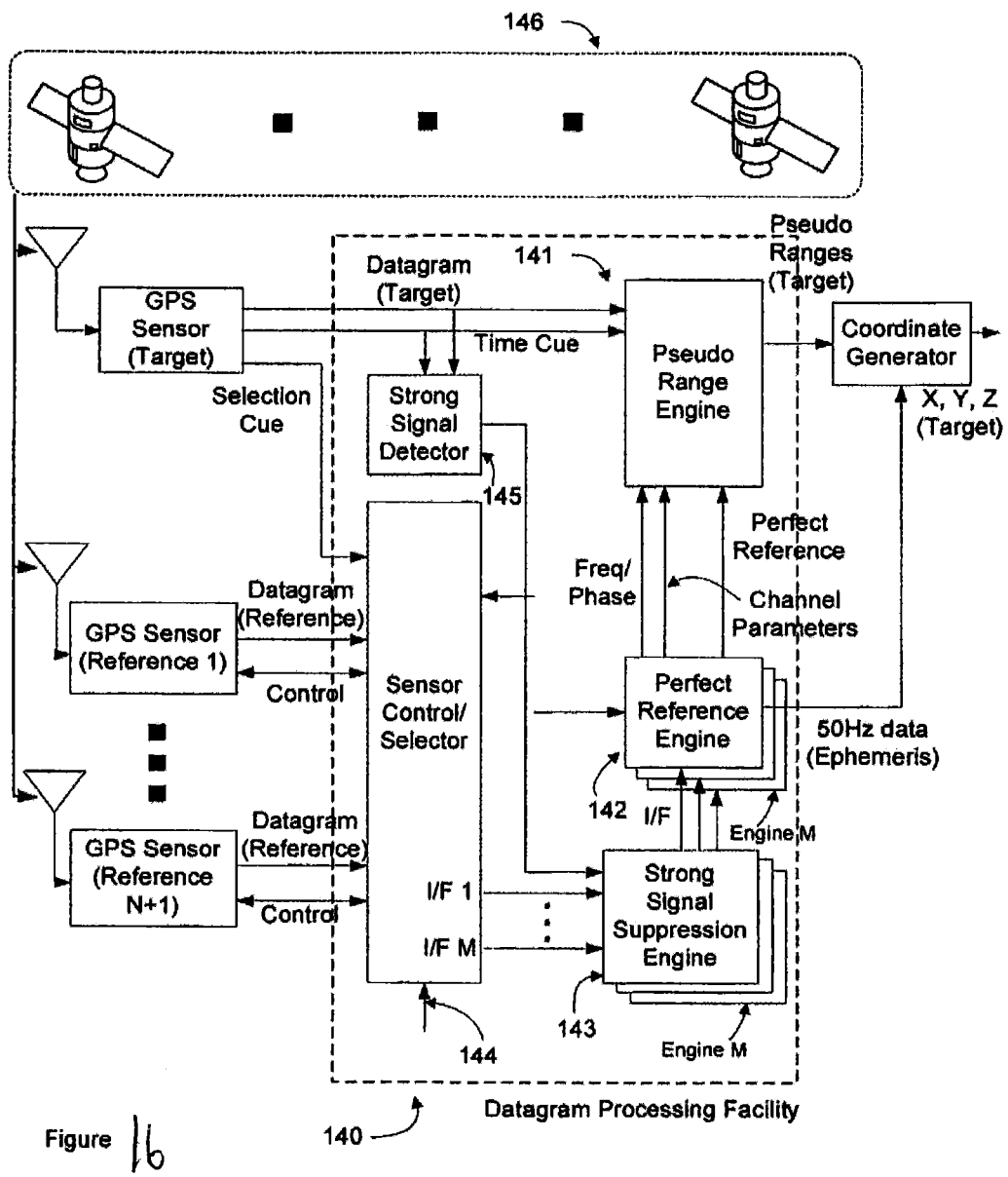
FIG. 16 shows a block diagram of a datagram processing facility employing the present invention FIG. 17 describes one construction of a strong signal suppression engine

FIG. 15 describes one embodiment of the Strong Signal Detector of FIG. 12. Strong Signal Detector 130 implements a simple correlation process, wherein the first (say) 20 PRN code intervals of the target datagram is processed (Correlator 132) to determine which, if any, satellites are electronically visible, and to characterize their signals. The use of a correlator, has the benefit of providing implicitly, a particularly useful metric for the strength of each of the detected satellite signals; namely, the correlation peak/average ratio. This metric enables the rank ordering of signals/satellites by strength. It further enables the definition of a strong signal selection threshold, with operational as well as performance implications. Applying specified "electronic visibility" criteria, Strong Signal Detector 124, provides the identification and characterization of the strongest satellite signals at the target.

The Sensor Controller/Selector 123 has two major functions. The control function ensures that the reference GPS sensor or sensors are on-line and performing, delivering reference datagrams suitable for use in fixing the locations of target GPS sensors. Where a set of reference sensors includes mobile sensors, the control function includes turning them on and off to extend battery life, and to initiate a service call to replace a weak battery.

The selection function determines the choice (if there is one) of reference GPS sensors/datagrams to be used in the derivation of the perfect reference to be used in extracting the location implicit in each target datagram as received at the Datagram Processing Facility 120. In general, the selection is made from reference GPS sensors in the neighborhood of the target receiver, assuming a location cue, such as the approximate location obtained by analyzing the relative signal strengths, measured at the target GPS sensor, to nearby cellular base stations, is available. In the case where the SPS is constructed with uni-directional antennae, the selection process is driven by the hemispheric mapping of satellites identified by the Strong Signal Detector 124 as being electronically visible to the target sensor (see below).

The Datagram Processing Facility of FIG. 14 supports an SPS constructed with uni-directional antennae. In this case, the identities of the satellites electronically visible to the target GPS sensor, generated by Strong Signal Detector 124, are used by Sensor Controller/Selector 123, with its up-to-the-minute mapping of satellites to reference GPS sensors, to configure its MUX. Accordingly, the outputs of the reference GPS sensors are multiplexed to produce, simultaneously, the I/F signals for each of M satellites electronically visible to the target GPS receiver. The presumption here is that Strong Signal Detector 124 has identified at least M strong signals. Failing this assumption, Sensor Controller/Selector 123 configures the MUX to produce, in addition to the I/F signals for each of the m satellites identified by Strong Signal Detector 124, the I/F signals for each of M-m complementary satellites hemispherically visible to the target GPS receiver. It is further presumed that a bank of at least M Perfect Reference Engines is available to process the simultaneously presented I/F signals.

The Datagram Processing Facility of FIG. 14 supports an SPS constructed with omni-directional antennae. The Pseudo Range Engine, Perfect Reference Engine and Strong Signal Detector of Datagram Processing Facility 140 are functionally identical to their counterpart components in Datagram Processing Facility 120. The difference is reflected in the incorporation, between the Sensor Controller/Selector 144 and Perfect Reference Engine 142, of the Strong Signal Suppression Engine 143. In this case, the Sensor Controller/Selector 144 acts primarily on the location cue to configure the MUX.

The identity and characteristics of the satellite signals electronically visible to the target GPS sensor generated by Strong Signal Detector 145 are used to configure/initialize the Strong Signal Suppression Engine 143 and the Perfect Reference Engine 142. Strong Signal Suppression Engine 143 produces, simultaneously, the I/F signals for each of M satellites electronically visible to the target GPS receiver, each with at least N of the strongest potentially-interfering satellite signals suppressed. The presumption here is that Strong Signal Detector 145 has identified at least M strong signals. Failing this assumption, Strong Signal Suppression Engine 143 produces, in addition to the I/F signals for each of the m satellites identified by Strong Signal Detector 145, the I/F signals for each of M-m complementary satellites hemispherically visible to the target GPS receiver, each with at least N of the strongest potentially-interfering satellite signals suppressed. It is further presumed that a bank of at least M Perfect Reference Engines is available to process the simultaneously presented I/F signals.

Figure 17:
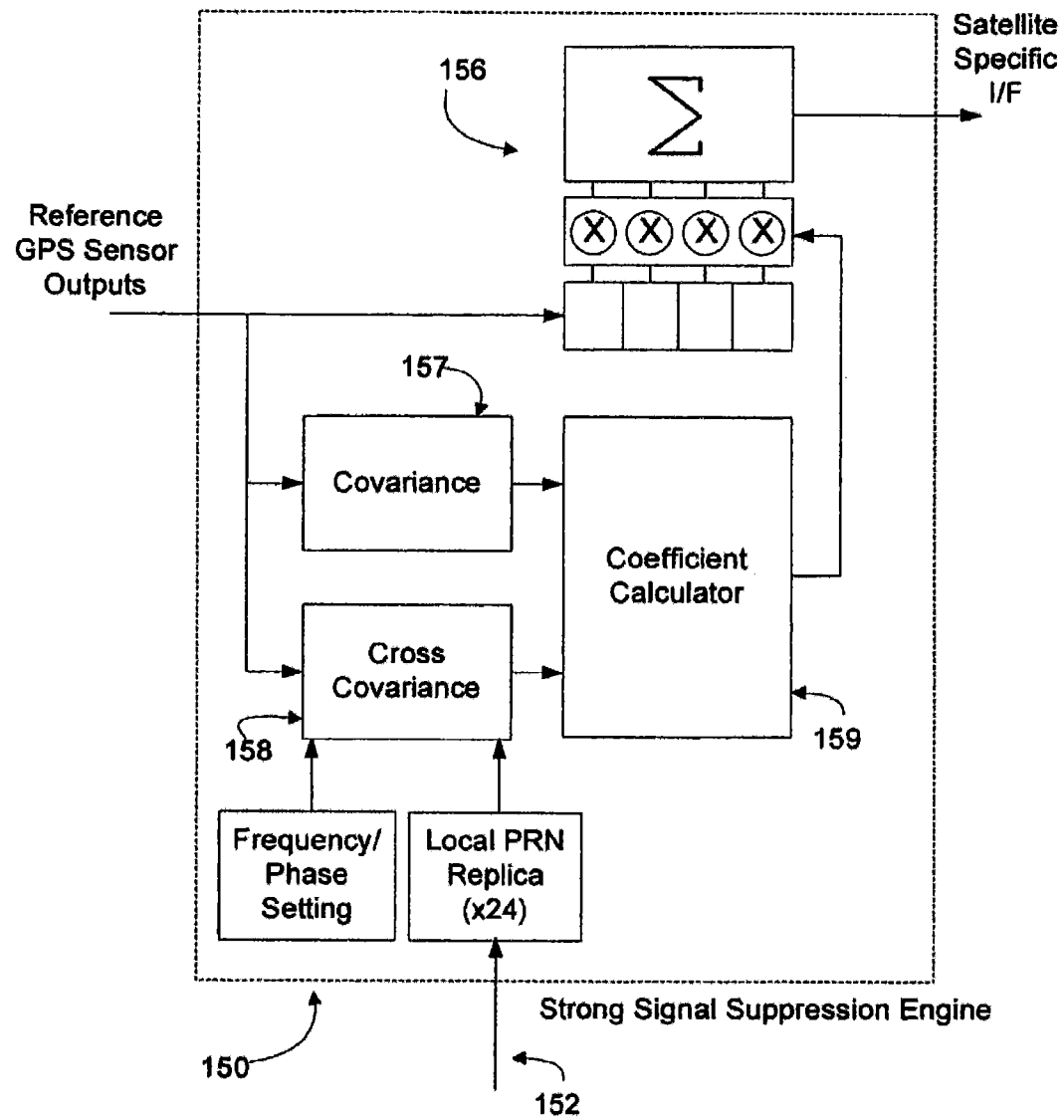

The Strong Signal Suppression Engine incorporates one or more I/F signal synthesis engines together with the logic to control them. The control logic serves to initialize the synthesis engine(s) for the synthesis of the desired I/F signal(s). An example of one such engine is described in FIG. 17. With input from N+1 reference GPS sensors, Strong Signal Suppression Engine 150 synthesizes a single I/F signal corresponding to the satellite-specific PRN code provided. The I/F signal is synthesized as a weighted sum of the N+1 reference GPS sensor inputs. The weighting coefficients are generated from a covariance matrix common for all satellites and a cross covariance matrix for each desired signal. Where it is desired to simultaneously synthesize M I/F signals, this engine could be replicated M times. Alternatively, a multi-output equivalent might be employed.

The Perfect Reference Engine 122 receives selected reference datagrams from the Sensor Controller/Selector 123 and processes them to obtain—in addition to the perfect reference—the 50 Hz data stream (carrying ephemeris data, etc.) and frequency, phase, and channel characterization parameters. The frequency, phase, and channel characterization parameters together with the perfect reference are used by the Pseudo Range Engine 121 to extract target pseudo ranges from the target datagram. These target pseudo ranges, together with the associated 50 Hz data streams are used by the Coordinate Generator to derive the coordinates of the target for use by location-based applications.

As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

I claim:
1. A method, comprising:
at each antenna in a receiver including a plurality of antennas, receiving satellite signals from a plurality of satellites including a target satellite;
determining a covariance matrix for the received satellite signals from the plurality of antennas;
for a pseudorandom noise sequence used by the target satellite, determining a cross-variance matrix between the pseudorandom noise sequence and the received satellite signals from the plurality of antennas;

deriving a plurality of weighting coefficients from the covariance matrix and the cross-variance matrix; and multiplying each antenna's received satellite signals with a corresponding weighting coefficient from the plurality of weighting coefficients to produce a plurality of weighted signals that provides a maximum gain for the received satellite signal from the target satellite.

2. The method of claim 1, wherein multiplying each antenna's received satellite signals with the corresponding weighting coefficient further suppresses a gain to a received signal from an interfering transmitter.

3. The method of claim 1, further comprising correlating the plurality of weighted signals with the pseudorandom noise sequence to determine a pseudorange to the receiver.

4. The method of claim 3, wherein the pseudorandom noise sequence comprises a plurality of pseudorandom noise sequences.

5. A receiver, comprising:

a plurality of antennas for receiving satellite signals from a plurality of satellites including a target satellite;

a covariance calculation engine for determining a covariance matrix for the received satellite signals from the plurality of antennas;

a cross-covariance calculation engine for determining a cross-variance matrix between the pseudorandom noise sequence and the received satellite signals from the plurality of antennas;

a coefficient calculator for deriving a plurality of weighting coefficients from the covariance matrix and the cross-variance matrix; and a correlator for multiplying each antenna's received satellite signals with a corresponding weighting coefficient from the plurality of weighting coefficients to produce a plurality of weighted signals that provides a maximum gain for the received satellite signal from the target satellite.

6. The receiver of claim 5, wherein the correlator is further configured to multiply each antenna's received satellite signals with the corresponding weighting coefficient to further suppress a gain to a received signal from an interfering transmitter.

7. The receiver of claim 5, wherein the correlator is further configured to correlate the plurality of weighted signals with the pseudorandom noise sequence to determine a pseudorange to the receiver.

8. The receiver of claim 7, wherein the pseudorandom noise sequence comprises a plurality of pseudorandom noise sequences.

* * * * *